US010902820B2

(12) United States Patent
Peng et al.

(10) Patent No.: US 10,902,820 B2
(45) Date of Patent: Jan. 26, 2021

(54) DISPLAY DEVICE WITH DYNAMIC RESOLUTION ENHANCEMENT

(71) Applicant: Facebook Technologies, LLC, Menlo Park, CA (US)

(72) Inventors: Fenglin Peng, Kirkland, WA (US); Lu Lu, Kirkland, WA (US); Jasmine Soria Sears, Redmond, WA (US); Ying Geng, Bellevue, WA (US); Wai Sze Tiffany Lam, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/027,035

(22) Filed: Jul. 3, 2018

(65) Prior Publication Data

US 2019/0318706 A1  Oct. 17, 2019

Related U.S. Application Data

(60) Provisional application No. 62/658,507, filed on Apr. 16, 2018.

(51) Int. Cl.
*G09G 5/10* (2006.01)

(52) U.S. Cl.
CPC ....... *G09G 5/10* (2013.01); *G09G 2300/0439* (2013.01); *G09G 2340/04* (2013.01)

(58) Field of Classification Search
CPC .................................. G09G 5/10; G09G 3/00
See application file for complete search history.

(56) References Cited

U.S. PATENT DOCUMENTS

| 6,061,103 A | 5/2000 | Okamura et al. |
| 6,100,944 A | 8/2000 | Sharp et al. |
| 6,184,969 B1 | 2/2001 | Fergason |
| 9,640,120 B2 | 5/2017 | Petrov |
| 10,115,327 B1* | 10/2018 | Lee .......... G09G 3/007 |
| 2002/0131691 A1* | 9/2002 | Garrett ........ G02B 6/2931 385/24 |
| 2004/0027313 A1 | 2/2004 | Pate et al. |
| 2004/0108971 A1 | 6/2004 | Waldern et al. |
| 2005/0025388 A1* | 2/2005 | Damera-Venkata ........ G09G 3/007 382/300 |
| 2006/0268207 A1 | 11/2006 | Tan et al. |

(Continued)

FOREIGN PATENT DOCUMENTS

EP    1558043    7/2005

*Primary Examiner* — Alexander Eisen
*Assistant Examiner* — Cory A Almeida
(74) *Attorney, Agent, or Firm* — Pequignot + Myers; Matthew A. Pequignot

(57) ABSTRACT

A display apparatus includes an electronic display having a pixel array configured to display a sequence of subframes, and an image shifting electro-optic device that is operable to shift at least a portion of an image of the display pixel array synchronously with displaying the sequence of subframes, so as to form a sequence of offset subframe images for providing an enhanced image resolution and pixel correction in a compound image. The image shifting electro-optic device may include a polarization switch in series with a polarization grating, for shifting image pixels between offset image positions in coordination with displaying consecutive subframes.

17 Claims, 19 Drawing Sheets

(56) References Cited

U.S. PATENT DOCUMENTS

| | | |
|---|---|---|
| 2007/0013795 A1* | 1/2007 | Sakamoto .......... H04N 5/23203 |
| | | 348/266 |
| 2008/0030527 A1 | 2/2008 | Kenji et al. |
| 2008/0068402 A1 | 3/2008 | Ioka et al. |
| 2015/0154933 A1* | 6/2015 | Bae ...................... G09G 3/2003 |
| | | 345/618 |
| 2015/0219983 A1 | 8/2015 | Mashitani et al. |
| 2017/0039906 A1 | 2/2017 | Jepsen |
| 2017/0115519 A1 | 4/2017 | Shi et al. |
| 2017/0192499 A1 | 7/2017 | Trail |
| 2017/0270637 A1 | 9/2017 | Perreault et al. |
| 2017/0299689 A1 | 10/2017 | Va et al. |
| 2019/0227492 A1 | 7/2019 | Kroll et al. |

* cited by examiner

DISPLAY DEVICE WITH DYNAMIC RESOLUTION ENHANCEMENT

CROSS-REFERENCE TO RELATED APPLICATIONS

The present invention claims priority from U.S. Patent Application No. 62/658,507 filed Apr. 16, 2018, which is incorporated herein by reference.

TECHNICAL FIELD

The present invention generally relates to optical display systems and devices, and in particular to methods and devices for enhancing a resolution of electronic displays.

BACKGROUND

Electronic displays typically include arrays of individually addressable pixels. An image is formed by selectively exciting pixels to a various degree of luminesce. The number of pixels per unit area, or pixel density, defines a native resolution of a display. Some display systems have magnification which increases an apparent pixel size. Humans with normal visual acuity, commonly identified as 20/20 vision, can distinguish two points separated by an angle of one arc minute (1'), which is the highest resolvable eyesight observed in the foveolar of a human eye. Within about +/−10° of the foveola, the visual acuity drops to 20/100, which corresponds to a resolution angle of 5'. Thus, a typical human eye with 20/20 sight can resolve two pixels in an image if the light rays they emit enter the eye at an angle to each other as small as 1'. However, in some applications the pixel density of an electronic display may be insufficient to directly support the ultimate resolution of a human eye; for example, rays emitted by neighboring pixels of an electronic display used in a typical head-mounted display (HDM) system may enter the eye at an angle greater than 1', and the user perception of the displayed image may suffer because of that. In addition, some displays have relatively small active pixel areas that emit light, which are surrounded by interstitial areas that are optically inactive and do not emit light. These interstitial areas are typically dark and may lead to a visual artifact known as screen door when the viewer is able to visually resolve the dark and active areas of the pixels.

BRIEF DESCRIPTION OF THE DRAWINGS

Embodiments disclosed herein will be described in greater detail with reference to the accompanying drawings which represent preferred embodiments thereof, which are not to scale, in which like elements are indicated with like reference numerals, and wherein.

DETAILED DESCRIPTION

Figure 1A:
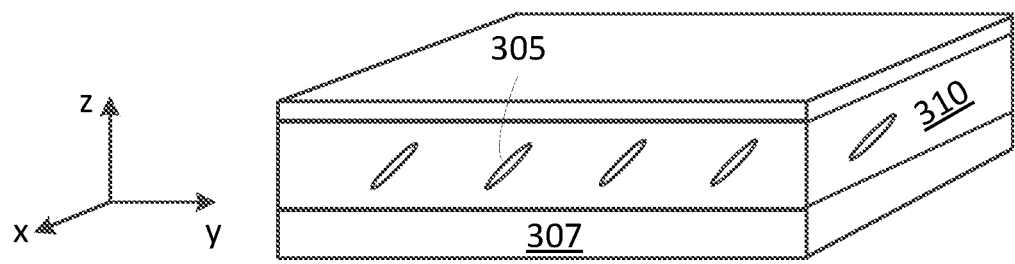
FIG. 1A is a schematic perspective view of a liquid crystal (LC) polarization device.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Block diagrams included with this specification can represent conceptual views of illustrative circuitry embodying principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Note that as used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Furthermore, the following abbreviations and acronyms may be used in the present document:
HMD Head Mounted Display
LC Liquid Crystal
LED Light Emitting Diode
CP Circular Polarized
LCP Left-handed Circular Polarized
RCP Right-handed Circular Polarized
HWP Half-Wave Plate, i.e. a waveplate with a modulo $2\pi$ retardance of an odd number of $\pi$ radian
QWP Quarter-Wave Plate, i.e. a waveplate with a modulo $2\pi$ retardance of $\pi/2$ radian
nWP n-wave Plate, i.e. a waveplate with a retardance of $n \cdot 2\pi$, or an integer number n=0, 1, 2 ... of wavelengths $\lambda$ The present disclosure relates to a method and related systems and devices that may correct for certain pixelation artifacts in various display systems, including but not limited to display systems for artificial reality (AR) applications such as a head mounted display (HMD) and a near-eye display (NED). The term "artificial reality" relates to a presentation of reality that has been adjusted in some manner. It encompasses a virtual reality (VR), an augmented reality (AR), a mixed reality (MR), a hybrid reality, or some combination and/or derivatives thereof. Pixelation artifacts are visual artifacts that may appear when the pixelated nature of an image presented by an electronic display becomes noticeable to the user. Pixelation artifacts that may be at least partially compensated for using approaches and techniques described herein include pixel-related limitations on image resolution, which may include limitations related to a display pixel density and the appearance of defective pixels in the image. Here, the term 'defective pixel' relates to pixels that lose the ability to emit light, i.e. "dead pixels", and pixels that emit less or more light than prescribed by a data signal applied to the pixel. The terms "shift" and "shifting" may encompass positional and angular shifts and positional and angular shifting, respectively.

An aspect of the present disclosure provides a display apparatus comprising: an electronic display comprising a pixel array configured to display a sequence of subframes; and, an optics block for forming an image of the pixel array, the image comprising an array of image pixels disposed at an image pixel pitch; wherein the optics block comprises an image shifting electro-optic device (ISOED) operable to shift at least a portion of the image synchronously with displaying the sequence of subframes, so as to form a sequence of offset subframe images for providing an enhanced effective image resolution in a compound image composed of the offset subframe images.

In some implementations the ISOED may be configured to shift the image by one or more discrete image shifts. The display apparatus may further comprise a display processor configured to obtain the sequence of subframes from an input image frame accounting for the one or more image shifts. In some implementations the ISOED is configured to move the image by a fraction of the pixel pitch so as to increase an effective image pixel density of the compound image.

In some implementations the input image frame may be defined at a higher resolution than the pixel array of the electronic display, and the display processor may be configured to sub-sample the input image frame, or image data related thereto, with one or more sampling offsets matching the one or more image shifts to obtain the sequence of subframes. The display apparatus may further comprise a controller configured to cause the ISOED to shift the image between consecutive subframes from the sequence of subframes.

In some implementations the ISOED may be configured to shift the image by the image pixel pitch, or a multiple thereof, so as to move an image pixel into a position of another image pixel prior to the shift for enabling the compensation for defective pixels.

In some implementations the display apparatus may further comprise a memory coupled to at least one of the display processor or the controller and configured for saving pixel information related to the defective pixels. The display processor may be configured to generate the subframes based at least in part on the pixel information saved in the memory. In some implementations the display processor may be configured to generate at least one of a greyscale map or a subframe scaling map based at least in part on the pixel information saved in the memory, and to use the at least one of the greyscale map or the subframe scaling map when generating the plurality of subframes. In some implementations the display apparatus may include a camera or detector system disposed to receive light emitted by the electronic display and configured to identify defective pixels in the pixel array of the electronic display.

In some implementations the array of pixels of the electronic display may be configured to emit image light for displaying the subframes, the ISOED may comprise a first steering device disposed to receive the image light and configured to switchably impart a first angular shift upon the image light from the electronic display, and the imaging optics may be configured to convert the first angular shift into a spatial offset in an image plane between two of the offset subframe images.

In some implementations the image light received by the steering device is polarized, and the first steering device comprises a first polarization switch configured to switch the image light between two orthogonal polarization states. A first polarization grating may be disposed in sequence with the first polarization switch and configured to diffract the image light of the two orthogonal polarization states at two polarization-dependent angles that differ by the first angular shift.

In some implementations the display apparatus may comprise a polarization conditioning device configured to transmit the image light towards the first polarization switch in a circular polarization state, the first polarization switch may comprise a first switchable half-wave plate (HWP), and the first polarization grating may comprise at least one of a first Pancharatnam Berry Phase (PBP) grating or a first volume holographic grating.

In some implementations the display apparatus may further comprise a second steering device disposed in sequence with the first steering device. The second steering device may comprise a second polarization switch and a second polarization grating disposed in sequence with the second polarization switch and configured to diffract the image light incident thereon in dependence on the polarization state thereof for imparting a second angular shift upon the image light. In some implementations the second polarization grating may be configured to diffract the image light incident thereon in a different plane than the first polarization grating for imparting a second angular shift upon the image light.

In some implementations the display apparatus may comprise a polarization conditioning device disposed upstream of the first and second steering devices and may be configured to transmit the image light in a circular polarization state. At least one of the first polarization switch or the second polarization switch may comprise a switchable half-wave plate (HWP), and at least one of the first polarization grating and the second polarization grating may comprise at least one of a Pancharatnam Berry Phase (PBP) grating or a holographic volume grating.

An aspect of the present disclosure provides a method for operating an electronic display, the method comprising: displaying, with a pixel array of the electronic display, a sequence of subframes for forming an image; and, shifting at least a portion of the image by one or more images shifts synchronously with displaying the sequence of subframes so as to provide at least one of: an enhanced effective image resolution, or a compensation for defective pixels.

In some implementations the method of claim 16 may further comprise sub-sampling a higher-resolution input image frame with one or more sampling offsets matching the one or more image shifts to obtain the sequence of subframes.

In some implementations of the method the sequence of subframes comprises n≥2 consecutive subframes, and the method further comprises sequentially shifting each image pixel of the at least a portion of the image to n different locations in an image plane over the sequence of n consecutive subframes.

In some implementations of the method the shifting comprises switching the image light between two orthogonal polarization states using one or more polarization switches, and steering the image light in dependence on the polarization state thereof using one or more polarization gratings.

An aspect of the present disclosure provides a display apparatus comprising: an electronic display system configured to transmit polarized light responsive to image data; a polarization switch configured to switch the polarized light between first and second orthogonal polarization states in synchronization with the electronic display refreshing the image data, and a polarization grating configured to diffract the polarized light of the first and second orthogonal polarization states at different diffraction angles for forming spatially offset images.

Figure 1B:
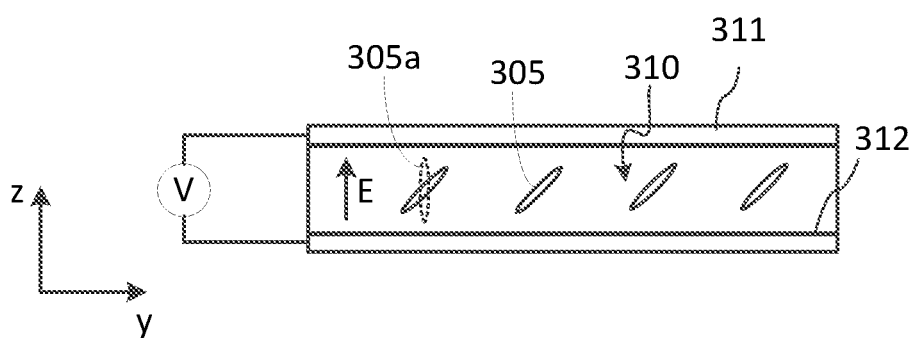
FIG. 1B is a schematic cross-sectional view of an electrically controlled active LC device.
Figure 1C:
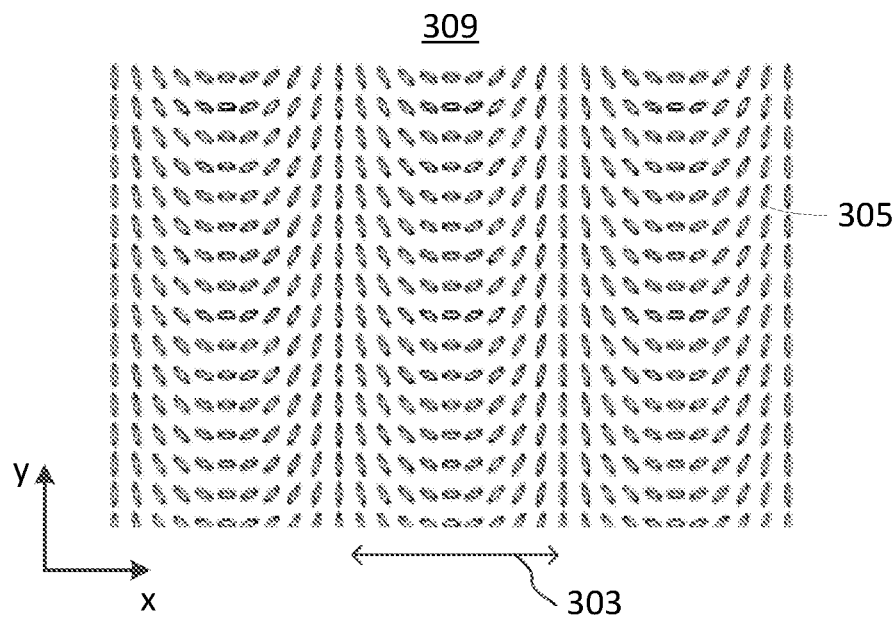
FIG. 1C is a schematic plan view of an LC Pancharatnam Berry Phase (PBP) grating.

With reference to FIGS. 1A-1C, some of the embodiments described herein may utilize liquid crystal (LC) based devices that operate in a polarization-sensitive manner. Such devices include, but are not limited to, LC polarization gratings and LC polarization switches. Referring first to FIG. 1A, LC devices described herein may be in the form of, or include, an LC layer 310 supported by a transparent or reflective substrate 307. The polarization properties of these devices may depend on the material properties of the LC layer 310, orientation of LC molecules 305 within the layer, the thickness of the LC layer 310, and the wavelength of incident light $\lambda$. The orientation of LC molecules 305 within the LC layer 310 may be defined in part by an alignment layer or layers (not shown) that may be disposed immediately adjacent to the LC layer 310. An LC device in which the orientation of LC molecules is generally uniform across the LC layer may operate as a waveplate retarder. For incident light of a specific polarization, an LC device in which the orientation of LC molecules varies in the plane of the layer, denoted as the (x,y) plane in FIG. 1A, may function as a lens or as a grating, depending on the LC orientation pattern. Volume holographic gratings with desired polarization processing properties may be fabricated with the LC molecule orientation varying both in plane of the LC layer and in the direction normal thereto (z-axis in FIGS. 1A-1D), i.e. along an optical axis of the LC device. An LC device may be active, where the LC material orientation is electrically controlled, or passive, where the LC material orientation is fixed in place via material properties, for example by the alignment layers and/or by a polymer mixed into the LC fluid and cured at a particular orientation within the LC layer.

Referring to FIG. 1B, an active LC device may be constructed with the LC layer 310 sandwiched between two electrodes 311, 312 that are transparent in the wavelength range of intended operation, for example two ITO (indium tin oxide) layers. In the absence of voltage between the electrodes, the LC molecules 305 may be oriented in a default pattern that imposes desired birefringence properties on the device, for example a desired uniform or non-uniform retardance. Applying a sufficient voltage V between the electrodes 311, 312 may reversibly re-align LC molecules 305 in a way that causes the LC layer 310 to transmit normally incident light without substantially changing the light's polarization or propagation direction. For example, in some LC materials applying a sufficient voltage V to the electrodes 311, 312 may align the LC molecules along the electric field, as indicated at 305a in the figure, so that the LC layer 310 will lose its birefringence for light at normal or close to normal incidence. An example of an active LC device is an active waveplate which retardance may be switched off and back on by applying a voltage V and by turning the voltage off, respectively. For example, an active LC device may be constructed to provide a HWP retardance in the absence of applied voltage, and substantially zero retardance when a sufficient voltage V is applied. One or more embodiments described herein may utilize such active LC HWPs as a polarization switch for polarized light. For example such polarization switch may reverse the chirality of circular polarized (CP) light incident thereon that in the absence of voltage (OFF state), and may leave the incident polarization state unchanged in the presence of voltage (ON state). The relationship between the applied voltage and the polarization action of an LC waveplate may be reversed in other embodiments.

Figure 1D:
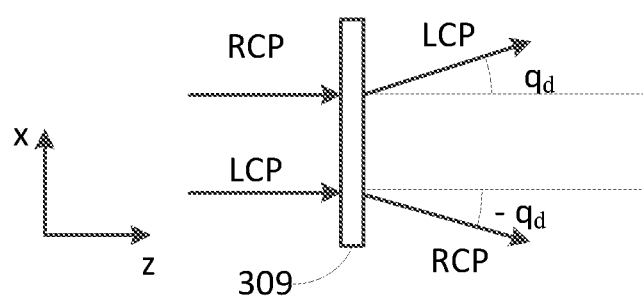
FIG. 1D is a schematic diagram illustrating the operation of an LC PBP grating; 'RCP' represents the right-hand circular polarized light and 'LCP' represents the left-hand circular polarized light.

Referring to FIGS. 1C and 1D, an LC device 309 in which the orientation of the LC material varies periodically or nearly periodically along a direction in the plane of the LC layer may function as a polarization grating. Such a grating may direct incident light at an angle that depends on the polarization state of the incident light. One example of an LC polarization grating is a Pancharatnam Berry Phase (PBP) grating, in which grating 'groves' are formed by spatially varying birefringence in the plane of the grating. The LC molecules 305 in such grating have varying orientations in the plane of the LC layer, indicated in the figure as an (x,y) plane, defining a device birefringence profile in the plane of the LC layer. The azimuth angle of the LC molecules in the plane of the grating continuously changes from center to the edge, typically with a fixed pitch 303. The LC layer in a PBP grating may be configured to deflect a right-circular polarized (RCP) light by a diffraction angle $\theta_d$ in one direction, and to deflect a left-circular polarized (LCP) light in an opposite direction, generally by the same diffraction angle $\theta_d$ and in a same plane, as illustrated in FIG. 1D. An LC PBP grating may be configured to provide a desired magnitude of the diffraction angle $\theta_d$. Such a grating may be either active, where the LC material orientation is electrically controlled, or passive, where the LC material orientation is fixed in place via material properties and/or alignment layers. An active LC PBP grating may be constructed as described hereinabove with reference to FIG. 1B. For example, an active LC PBP grating may deflect incident CP light by the diffraction angle $+\!\backslash\!-\theta_d$ depending on the chirality of incident light while simultaneously reversing its chirality in the absence of voltage (OFF state), and may leave both the direction of propagation and the polarization state of incident light unchanged in the presence of voltage (ON state). Another example of an LC polarization grating is a volume holographic LC grating, in which the orientation of the LC layer material may vary both in the plane of the LC layer and in the direction normal to the LC layer. Such gratings may be constructed to selectively deflect only one of two orthogonal linear polarizations, without substantially changing the propagation direction of the other of the two orthogonal polarizations. The volume holographic LC grating may operate, for example, as an active element where the LC material is electrically controlled, and/or as a passive element, together with a linear polarizer and an active polarization rotator operable to switch the polarization status of the incident light. Embodiments described below with reference to LC PBP gratings may be modified to use such volume holographic LC gratings instead.

Embodiments of the present disclosure may relate to pixelated electronic displays that include plurality of pixels, typically but not necessarily disposed on a rectangular grid, which can be selectively excited by pixel data signals to display images. The terms "electronic display" and "pixelated display" may be used herein interchangeably and encompass arrayed light sources with multiple individual emitters, which may be disposed in a two-dimensional (2D) array or in a one-dimensional (1D) array. Pixel data corresponding to a same visual pattern to be viewed as a single image may be provided to the electronic display, or to a processor associated with the electronic display, in the form of an image frame. The visual pattern to be displayed for viewing as a single image may represent for example a photographic image, an instantaneous scene of a video, specific information in a visual form, or a printing pattern in an apparatus for printing and lithography applications that uses a pixelated display as an image source. The terms image data, image signal, and image frame, may be used to encompass both video and still image data, video and still image signals, and video and still image frames, respectively. Generally one image frame represents a visual pattern sampled at a specified sampling grid, which defines the frame's resolution. Embodiments of the present disclosure may utilize an approach in which one visual pattern is displayed by the electronic display in a sequence of subframes. These subframes may correspond to a sampling grid matching the pixel array of the electronic display, an may differ by one or more sampling offsets between the subframes. Here the term "sampling offset" encompasses an offset in a column or row counter of the display's pixel array. In some embodiments the sequence of subframes may be obtained by sub-sampling a high-resolution frame. Here, the term sub-sampling, when used in reference to a frame, may refer to sampling of a visual pattern defined by the frame at a sampling grid of a lower resolution than that of the frame, and may include using an interpolation operation.

Figures 2A, 2B:
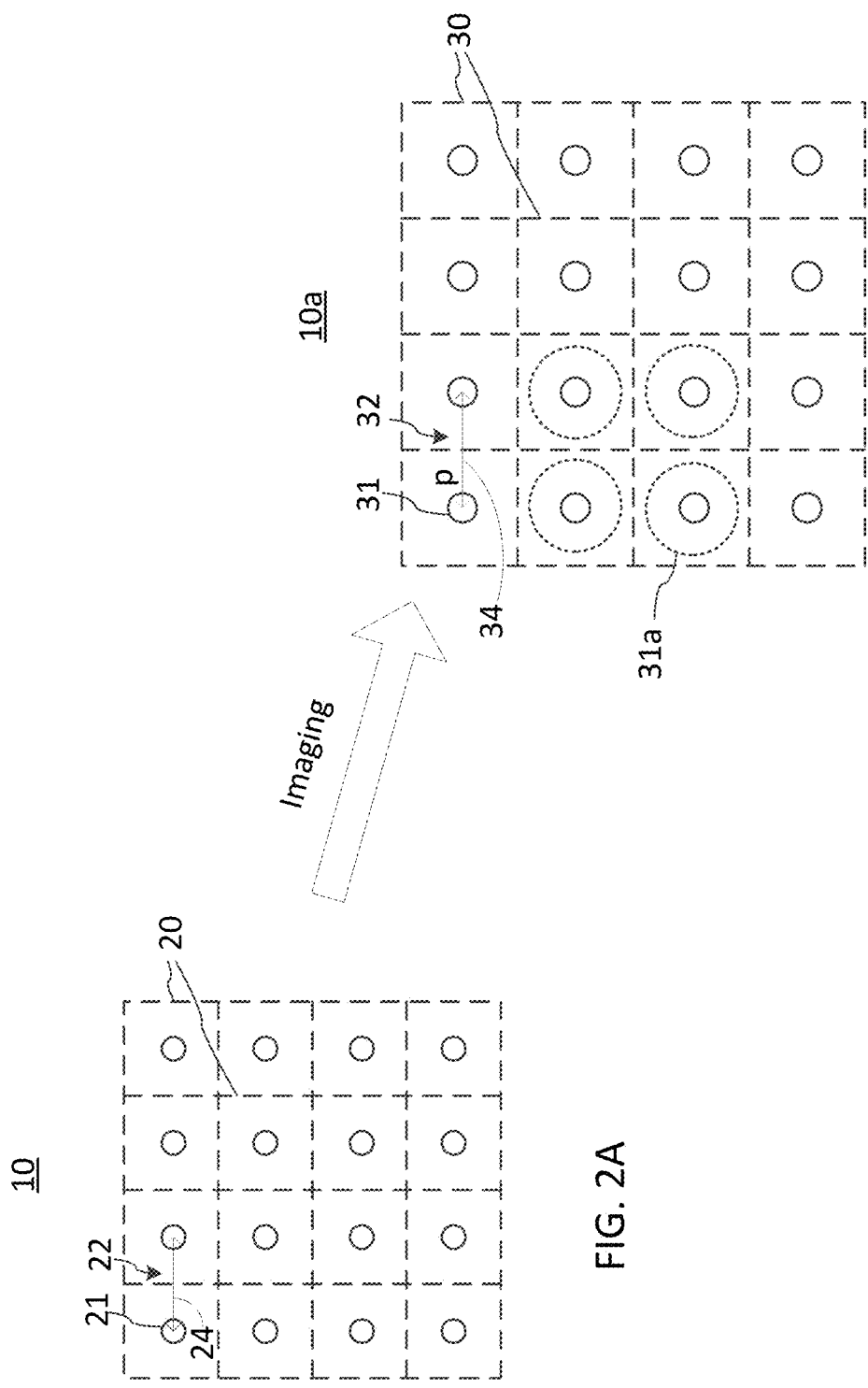
FIG. 2A is a schematic diagram of a 4×4 area of a pixel array of an electronic display showing interstitial spaces between pixel active areas.
FIG. 2B is a schematic diagram illustrating an image of the 4×4 portion of the pixel array of FIG. 2A that may be formed in a display system with magnification and/or active area size correction.

FIG. 2A schematically illustrates a portion of a light emitting surface of display 10 with a 2D array of pixels 20; although only a 4×4 segment of the array is shown, a typical 2D display may include hundreds or thousands of pixels in at least one dimension. Each pixel 20 may include one or more active areas 21 which in operation emit or transmit image light, and which may include one or more subpixels. Each pixel 20 may also include interstitial spaces 22 from which no light can be emitted or transmitted, or from which the illumination does not contribute to the image presented to the user. The proportion of the active area 21 to the inactive area 22 is known as the fill factor. The interstitial spaces 22 may also be referred to herein as the dark spaces or dark areas. Each active area 21 may include some combination of two or more subpixels that may be configured to emit or transmit light of different colors, for example a red (R) subpixel, a green (G) subpixel, and a blue (B) subpixel, although other color schemes are also possible. Display 10 may be for example an LC display, in which case the active areas in each pixel may be in the form, or include, LC apertures with controllable transmission of backlit light, or an LED display, in which case each active area may be in the form, or include, an exit aperture of a light emitting diode (LED). As used herein, the term "LED display" encompasses OLED, AMOLED, micro OLED and micro-LED displays. Displays in which individual active areas are formed with light emitters or transmitters of other types, such as for example but not exclusively vertical-cavity lasers (VCSELs), are also within the scope of the present disclosure. The distance 24 between centers of corresponding active areas 21 of adjacent pixels 20 along a specified direction in the plane of the pixel array may be referred to as the display pixel pitch. The presence of the dark spaces 22 may lead to an undesirable visual artifact known as the "screen door" effect (SDE), when the boundaries between individual image pixels become visible to a viewer. This effect may be particularly pronounced in display systems with magnification, such as an HMD or a projector display.

FIG. 2B illustrates an image 10a of the portion of the electronic display 10 as may be presented to the user of a display system, with images 31 of pixel active areas 21 disposed in a corresponding array with an image pixel pitch p 34. Images 31 of pixel active areas may be referred to herein as image pixels. In some embodiments image 10a may be a magnified image of the pixel array of the electronic display 10 obtained in a display system including magnification optics. The dark interstitial spaces 22 of display 10 may give rise to dark spaces 32 in the image 10a. These dark spaces may be visible if the viewing angle subtended by the dark space 32 in the image exceeds the eye resolution, e.g. 1' for the 20/20 sight, resulting in the SDE. The SDE may be reduced or eliminated by using active area light expanders, such as a microlens array, or by using de-focusing and/or blurring components or techniques, which effectively expand image pixels 31 into the interstitial spaces 32, as schematically illustrated at 31a. Neither of these approaches would however improve the resolution of the display for the viewer. Embodiments described below may replace, or in some instances supplement, the use of such pixel expanding or blurring techniques with a dynamic approach to image enhancement allowing to increase an effective display resolution of an image produced with the display.

Embodiments described below utilize a dynamic technique to correct for at least some image imperfections that may occur in display systems with pixelated displays, and to enhance image quality as perceived by the viewer. The technique relies in part on a finite response time of a human visual system to fast changing images, which causes several images appearing one after another within the visual response time to be perceived by the viewer as a single image.

In at least some embodiments the technique may include a) displaying, with a pixelated electronic display, an image defined by pixel or frame data, and b) shifting the image, or at least a portion thereof, by one or more image shifts in coordination with refreshing the pixel data. At least some embodiments of the technique may include providing the pixel or frame data to an electronic display in the form of a sequence of subframes, with the subframes representing a same target image that is sampled with a varying sampling offset that matches the image shifts. In some embodiments the subframes of the sequence are obtained from a same input image frame. The pixel data may be refreshed to display a next subframe in the sequence, with the image shifting performed between the subframes. The technique may include placing an image of one subframe at an offset position relative to an image of a preceding subframe to form mutually offset subframe images provided in a sequence. In some embodiments the technique may include placing an image of each subframe at an offset position relative to an image of a preceding subframe or a following subframe to form a sequence of mutually offset subframe images. A superposition of mutually offset subframe images forms a compound image which may have a higher effective image pixel density than each of the subframe images, and/or have image pixels from different subframe images substantially overlap to provide pixel redundancy. In some embodiments consecutive subframes may be displayed at a frame rate r of the electronic display, which may be referred to herein as the display frame rate r. A sequence of input image frames, for example of a video, may then be displayed to the viewer at an effective frame rate $R=r/n$, where $n \geq 2$ is the number of the subframes used to display one input image frame.

Figure 3A:
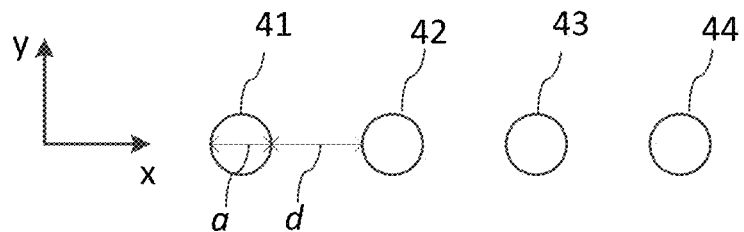
FIG. 3A is a schematic diagram illustrating a linear array of four adjacent pixels of an electronic display in one pixel row or column.
Figure 3B:
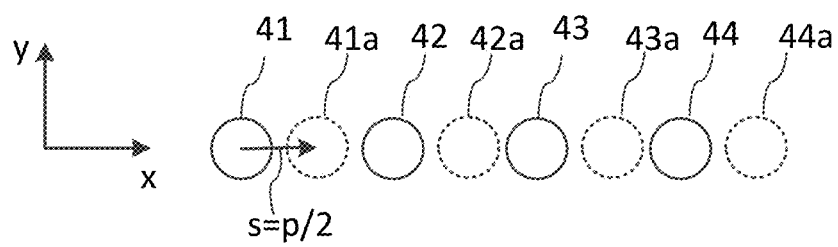
FIG. 3B is a schematic diagram illustrating the effect of dynamic image displacement on the linear array of pixels of FIG. 3A for effective resolution enhancement.
Figure 3C:
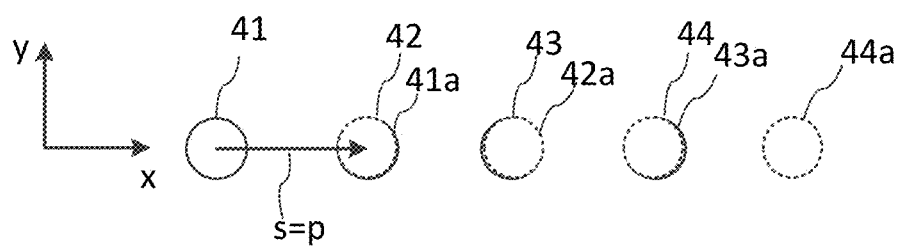
FIG. 3C is a schematic diagram illustrating the effect of dynamic image displacement on the linear array of pixels of FIG. 3A for pixel correction.

Turning now to FIGS. 3A-3C, an example application of this method is illustrated with reference to a linear sequence of four image pixels 41-44 disposed along an x-axis, which may correspond to four consecutive pixels in a row or a column of pixels of an electronic display. In the illustrated example the size a of image pixels does not exceed the size d of the dark spaces between them, as indicated in FIG. 3A. In other embodiments the image pixels may be greater in size than the dark spaces between them. FIG. 3B illustrates the shifting of the image pixels 41-44 by a distance s corresponding to a fraction of the image pixel pitch p in the image space, $p=(a+d)$, between two consecutive subframes, for example by $s=p/2$, which produces a new set of image pixels 41a-44a that may be located at least partially in the dark spaces of an image of a preceding subframe. Image pixels 41-44 prior to the shift may be said to belong to a first subframe image, and image pixels 41a-44a after the shift may be said to belong to a second subframe image that is offset by s from the first subframe image. If the display frame rate r is high enough, the viewer perceives an image formed by the two subframe images as a single compound image having twice the image resolution in the direction of the shift, i.e. along the x-axis in the illustrated example, as defined by the image pixel density in the compound image. FIG. 3C illustrates a mode of operation in which the image pixels 41-44 are shifted by a distance equal to the image pixel pitch p, so that pixel images in two consecutive subframes overlap. This mode of operation provides pixel redundancy and allows to correct for pixel defects of the display, by placing images of a normally functioning pixel, termed "working pixel", into the image positions of a defective pixel or pixels in a preceding frame or subframe. As the likelihood of having defective pixel increases with the size of the pixel array, yield of usable electronic displays may be improved by configuring the display system to use normally functioning pixels to compensate for their defective neighbors. A defective pixel that either no longer operates or operates at a lower light level than desired can be compensated by temporally overlapping either a single neighbor or multiple neighbors to temporally fill in the missing light from the dead or defective pixel.

General System Description

Figure 4:
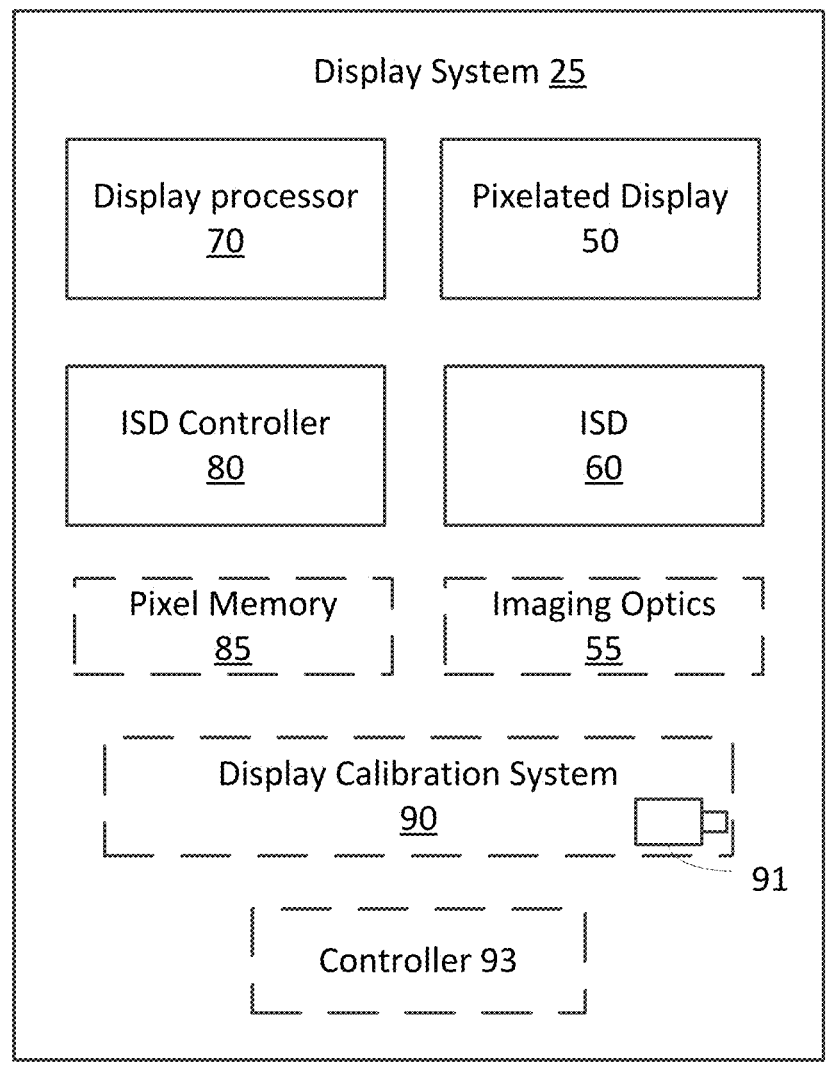
FIG. 4 is a schematic block diagram of a display system with dynamic image displacement according to some embodiments.

FIG. 4 illustrates a general block diagram of a display system 25 configured to implement the dynamic image displacement for enhancing effective resolution and/or pixel correction that has been generally described hereinabove.

The display system 25 may include an electronic display 50, a display processor 70, an image shifting device (ISD) 60, and an ISD controller 80. The electronic display 50 may also be referred to herein simply as display 50. In some embodiments the display system 25 may further include pixel memory 85 for saving information related to or identifying defective pixels. In some embodiments the display system 25 may further include a display calibration system (DSC) 90. The pixelated display 50 includes an array of pixels, each pixel including one or more active areas that are configured to emit or transmit light in response to receiving image data, and interstitial spaces that may appear as dark to a viewer when ISD 60 is absent. The number of pixels in the pixel array of display 50 defines a native resolution of the display. By way of example, the pixel array of the display 50 may be a rectangular array of size N×M, with N pixel columns and M pixel rows. Optionally the pixelated display 50 may also include imaging optics 55 configured to form an image of the pixel array of the display 50 for presenting to a viewer. In some embodiments imaging optics may be included elsewhere in the display system 25. In some embodiments imaging optics 55 may be absent, for example where the display system 25 is a direct-view display. The electronic display 50 may be operationally coupled to the display processor 70, which may be configured to operate in coordination with the ISD 60 and/or ISD controller 80 to provide pixel data to the display 50.

Figure 5:
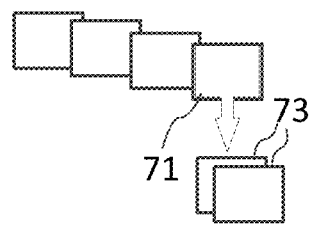
FIG. 5 is a schematic diagram illustrating the process of forming subframes from image or video frames in the display system of FIG. 4 according to an embodiment.

Referring also to FIG. 5, in one or more embodiments the display processor 70 may be configured to feed pixel data to display 50, for example in the form of a sequence of image frames or subframes 73 as described in further detail below. In operation, the electronic display 50 receives the pixel data from the display processor 70, and presents corresponding images to the user by selectively exciting a pattern of pixel active areas at luminance levels defined by the pixel data. In one or more embodiments the display processor 70 may be configured to receive a sequence of input image frames 71, to render each input image frame 71 so as to convert it to a sequence of two or more subframes 73 with a sampling offset between the subframes, and to feed the sequence of subframes 73 to display 50 for displaying at the display frame rate r. The term "subframe", as used herein, encompasses image frames defined at the pixel resolution of display 50.

The ISD 60 may be configured to dynamically shift an image of at least a portion of the electronic display 50, or of the pixel array thereof, at the display frame rate r so as to cycle between two or more image displacements that correspond to the sampling offsets of the subframes 73. The ISD controller 80 may synchronize the image shifting by the ISD 60 to the sequence of subframes 73 being displayed by the electronic display 50, generally as described hereinabove with reference to FIGS. 3A-3C. For example the ISD 60 may be activated by the ISD controller 80 to perform an image shift immediately prior to displaying a next subframe 73 with a sampling offset corresponding to the image shift. In at least some embodiments the ISD 60 may be an electro-optic device, and may be referred to as an image-shifting electro-optic device (ISEOD). In some embodiments it may be a mirrorless device, absent of mechanically moving parts, that is configured to shift an image by modifying a phase of image light associated with the image.

Dynamic Resolution Enhancement

In some embodiments, the ISD 60 may be configured to shift an image of the display 50, or a portion thereof, by a fraction η of the display pixel pitch in an image plane. In such embodiments the processor 70 may be configured to render a higher-resolution input image frame 71 into two or more subframes 73 of a lower resolution at offset sampling grids. In some embodiments this lower resolution may correspond to the native resolution of the electronic display 50, and the subframes 73 may represent a same scene or pattern sampled with an offset or offsets matching the fraction η of the pixel image pitch.

By way of example, display 50 may have native resolution of N×M, where N and M are the numbers of pixel columns and rows, respectively; in operation the display processor 70 may receive a sequence of high-resolution input image frames 71 at a resolution of K×L, where K and L are the numbers of columns and rows in the sampling grid used to generate frame 71. In some embodiments the size of the K×L array may exceed the size of the N×M array in at least one of the row and column dimensions. In some embodiments the size of these arrays may be the same, i.e. K=N and M=L. In some embodiments the display processor 70 may be configured to generate each subframe 73 by interpolating an image defined by the input image frame 71 to a N×M sampling grid defined by a pixel layout of display 50, with a sampling offset corresponding to an image shift imparted by the ISD 60.

Generally the ISD 60 may be configured to temporarily shift an image of the display, or a portion thereof, in the image plane by any one of n≥2 different displacement vectors $\vec{s}_i$, i=1, ..., n, so that one active area of the display may be sequentially imaged to n different locations in the image plane to form n image pixels from each active area of the display pixel array. In some embodiments, the ISD 60 may be controlled by the ISD controller 80 to temporarily shift an image of each active area of the electronic display 50 sequentially between n≥2 different positions for each frame 71, so as to cycle between a constellation on n image pixels for each display pixel. In the context of this specification, an image of a pixel or active area that temporary appears at a specific location when the ISD 60 is in a specific state may be referred to as a virtual pixel or a virtual image pixel. Accordingly, the ISD 60 that is switchable between n different states may form a constellation of n virtual pixels for each physical display pixel. The processor 70 may be configured to convert each input image frame 71 into n subframes 73, all representing a same scene as defined by the input image frame 71, but sampled with n different offsets corresponding to the image shifts $\vec{s}_i$ imparted by the ISD 60. The ISD controller 80 is operable to activate the ISD 60 to shift the image in synchronization with display 50 displaying the corresponding subframes 73. In some embodiments the ISD 60 may be controlled to perform an image shift between each two consecutive subframes.

In some embodiments, at least some of the image shifts $\vec{s}_i$ may correspond to moving at least some of the image pixels into dark interstitial spaces between image pixels prior to the shift, thereby effectively increasing the number of image pixels per unit area in a compound image formed by the n consecutive subframes 73. This enables an effective image resolution enhancement by up to n times. In some embodiments the ISD 60 may be configured so that areas occupied by the constellation of virtual pixels corresponding to adjacent display pixels do not overlap. In some embodiments the ISD 60 may be configured so that areas occupied by the constellation of virtual pixels corresponding to at least some adjacent display pixels partially overlap.

Pixel Correction

In some embodiments the ISD 60 may be configured so that at least some of the n virtual pixels produced by the ISD 60 from one display pixel overlap with at least some of the n virtual pixels associated with an adjacent display pixel, thereby enabling pixel redundancy and correction. This may include placing an image of an active area of a pixel of the electronic display 50, termed herein "image pixel", into a position of an image of another active area prior to the shift. In operation the ISD 60 may shift the image of at least a portion of the display 50 between two or more of the n image positions so as to periodically place an image of a working pixel into the position of an image of a defective pixel in a preceding subframe, thereby correcting for, or at least reducing, the pixel defects. In such embodiments the subframes 73 may be of the same resolution as the input image frame 71, but may represent the corresponding scene or pattern sampled with a sampling offset varying by a pixel pitch of the display 50, or an integer number thereof. In some embodiments two consecutive subframes 73 may each be substantially a same input frame 71 with a counter of pixel columns and/or pixel rows incremented or decremented by one.

In some embodiments, the ISD controller 80 and/or the display processor 70 may be configured to activated only a sub-set of the n different image shifts or positions enabled by the ISD 60 for each frame 71. In some embodiments the selected subset of the image shifts or positions may be selected based on information related to the location of defective pixels of the electronic display 50. Information about the location of defective pixels of the electronic display 50 may be saved in pixel memory 85. Pixel memory 85 may be embodied using a suitable non-transitory medium that may be accessed by the ISD controller 80 and/or the display processor 70, including but not limited to a computer-readable memory device, register memory, processor cache, and random access memory (RAM).

Display Calibration

Figure 6:
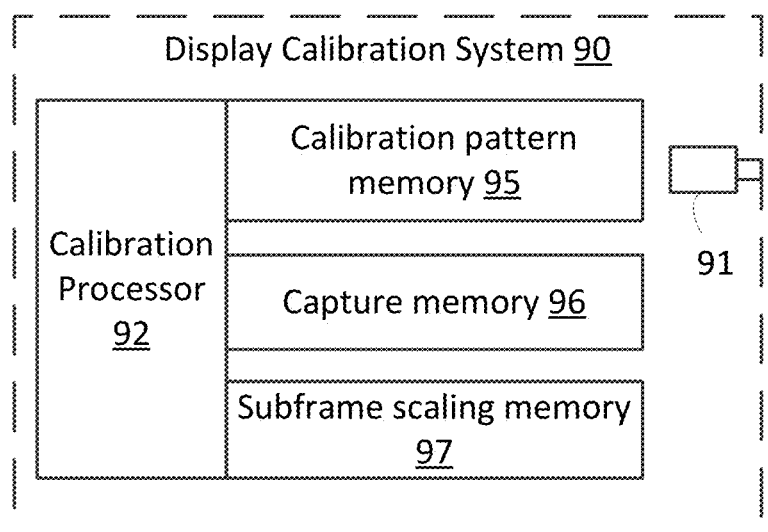
FIG. 6 is a block diagram of an example display calibration system for pixel correction by dynamic image displacement.

Referring also to a block diagram of FIG. 6, in some embodiments the display system 25 may include a display calibration system (DCS) 90. In some embodiments the DCS 90 may be configured to determine the location of defective pixels and/or active areas in the pixel array of display 50. In some embodiments the DCS 90 may be configured to facilitate the identification of defective pixels by the user. Referring to FIG. 6, in some embodiments the DCS 90 may include one or more of the following functional modules: a camera 91 configured to capture one or more images of the display 50, an image capture memory 96 for saving captured images, and a calibration processor or processing module 92 configured for processing saved image captures and/or identifying defective pixels based on the image captures or user input. In some embodiments the display calibration system 90 may include calibration pattern memory 95 storing one or more display calibration patterns for displaying during a display calibration process. In some embodiments the display calibration system 90 may include subframe scaling memory 97 storing pixel scaling data for the subframes. In some embodiments camera 91 may be substituted with a photodetector, or omitted. Memory blocks 95-97 may be embodied using suitable non-transitory media that may be accessed by the calibration processor 92 and/or the display processor 70, including but not limited to a computer-readable memory device, register memory, processor cache, and random access memory (RAM).

Figure 7:
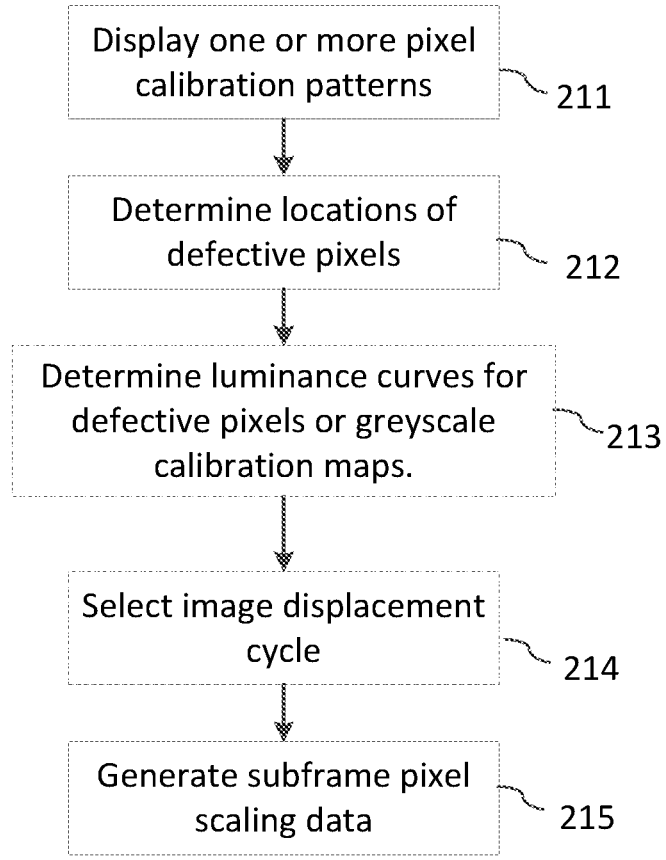
FIG. 7 is a flowchart of an example subframe generation process for pixel correction by dynamic image displacement.

FIG. 7 shows a flowchart of an example display calibration process 250. The DCS 90 may be configured to implement process 250 to identify defective pixels, and to facilitate their correction in some embodiments. Process 250 may include displaying one or more pixel calibration patterns by the display 50, as illustrated at block at 211, and determining the locations of defective pixels based on images of the displayed pattern or patterns, as illustrated at block 212. In some embodiments the process may also include determining luminance curves, or their equivalents, for defective pixels, as illustrated at block 213. In some embodiments the process may also include selecting an image displacement cycle, to be implemented with the ISD 60, for correcting the defective pixels, as illustrated at block 214. In some embodiments the process may also include generating subframe pixel scaling data for correcting the defective pixels, as illustrated at block 215. Operations indicated at blocks 213-215, and at block 212 in some embodiments, may be performed for example by the calibration processor 92, or by the calibration processor 92 in cooperation with the display processor 70. The display processor 70 and the calibration processor 92 may be implemented using separate hardware processors or using a shared hardware processor. Examples of hardware processors that may be used in various embodiments described herein include, but are not limited to, digital signal processors, microprocessors, general purpose processors, programmable hardware logic, and any combination thereof.

In one or more embodiments the process of identifying the location and/or characteristics of defective pixels, as indicated at block 212 of FIG. 7, may include a single image capture by camera 91 or a sequence of image captures. In embodiments wherein camera 91 has a resolution that is sufficiently high to resolve adjacent pixels and active areas of display 50, single image capture by camera 91 may be sufficient to identify individual defective pixels of display 50. Sequential image captures while displaying a sequence of calibration patterns can lower the resolution requirements of the camera 91, and therefore reduce the cost of the display system 10. In some embodiments a sequential image capture may include sequentially activating different predetermined sparse patterns of pixels or active areas of display 50 in consecutive image captures. In some embodiments, the display calibration subsystem 90 may be configured to excite active areas of different colors separately, capturing a display image for each color individually. Camera 91 may be monochrome in such embodiments. In some embodiments the DCS 90 may be configured to activate or deactivate one or more fiducial pixels, or groupings of such pixels, prior to the image capture by the camera 91 to facilitate determining the location of a defective pixel. Embodiments in which camera 91 is substituted with a photodetector may also be envisioned; in such embodiments the display calibration system 90 and/or the display processor 70 may be configured to cycle through pixels and/or active areas of display 50 in sequence, activating them one by one or in groups of a few pixels, with the lack of light or insufficient light identifying which pixels and/or active areas are defective.

In some embodiments the display image captures obtained by camera 91 may be stored in the capture memory 96, and analyzed by the calibration processor 92 to determine the location of a defective pixel in the pixel array of display 50. This determination may be performed for example based on a defect location in one or more of the captured images and known configurations of the displayed calibration patterns. Generally the greater the number of predetermined pixel patterned that are sequentially excited, the more sparse they may be, and the lower may be the resolution of the camera 91.

In some embodiments the DCS 90 may be configured to characterize light emitting capabilities of a defective pixel or active area in the pixel array of display 50. This may include determining whether a particular defective pixel or active area is dead, i.e. is incapable of emitting light, or emit light of incorrect intensity. In some embodiments the DCS 90 may cycle through a plurality of pixel luminance settings for the display 50 while camera 91 captures images of the display 50 in order to obtain one or more grayscale calibration maps and/or to determine luminance curves for defective pixels, as indicated at block 213 of FIG. 7. The calibration processing unit or module 92 may use stored grayscale maps or pixel luminance curves to identify defective pixels which luminance response to a pixel excitation signal deviates from a specified pixel response, i.e. which emit less or more light than specified for applied pixel signal. In some embodiments the calibration processor 92 of the DCS 90 may be configured determine color balance at one or more pixel brightness levels based on the stored grayscale maps or pixel luminance curves for active areas of specific colors. In some embodiments the calibration processor 92 may be configured to compute a color and/or brightness correction matrix to enable suitable color and brightness correction of one or more pixels.

In some embodiments the DCS 90 may direct the display system 25 to operate in a pixel correction mode when the number of defective pixels that lack the ability to function within a predetermined range of characteristics exceeds a specified threshold. In the pixel correction mode the ISD 60 may cycle through two or more states for each input frame 71, with the display processor 70 feeding corresponding subframes 73 to the display 50, so as to temporarily shift working pixels into the positions of identified defective pixels and to compensate for the lack of light at the defective pixel location. The processing unit 92 of the DCS 90 may generate subframe scaling data for each subframe 73, for example based on the stored grayscale maps or pixel luminance curves for active areas of specific colors. This subframe scaling data may then be used by the display processor 70 during normal operation of the display system 25 to provide a desired intensity scaling of input image frames 71 when generating the subframes 73. In some embodiments the display processor 70 may be configured to generate the subframe scaling data for each subframe 73, for example based on the desired level or resolution enhancement and the number of image shifts per image cycle.

In embodiments wherein the ISD 60 is capable of shifting the display image to more than two locations, the display calibration subsystem 90 may be configured to select, based on the locations of identified defective pixels, a subset of ISD states to cycle through in the pixel correction mode of operation, as indicated at block 214 of FIG. 7.

In some embodiments the display calibration may be performed multiple times over the life of the display system to compensate for a deterioration of the display 50 over time, for example when the display system 25 is idle but powered. In embodiments wherein the display system 25 is battery operated, for example when the display system 25 is a head-mounted display (HMD), the calibration may be conveniently performed during charging of the battery. In some embodiments the DCS 90 may be a part of the display system 10. In some embodiments the DCS 90, or elements thereof such as the camera 91, may be separate from the display system 25 during normal operation thereof. In some embodiments the DCS 90 may be incorporated in a docking station, for example a HMD docking station when the display system 25 is an HMD.

In some embodiments the DCS 90 may lack a camera or detector and may be configured to accept user's input to identify defective pixels. An optional controller 93 (FIG. 4) may be provided that is configured to enable control of one or more fiducial elements of a graphical user interface (GUI) of the display 50. Such fiducial elements may be for example in the form of a crosshair and/or a box that are user-movable across the display by means of the controller 93. The DCS 90 may be configured to feed one or more calibration frames to the display 50 defining one or more predetermined pixel excitation patterns, and wait for the user's input. Such patterns may include, for example, a flat white field, among others. Defective pixels may then be identified by local color shading or loss of brightness at specific locations of the display. A fiducial element of the GUI, such as a crosshair or box, may be moved via controller 93 by the user to target defective pixels. User controls to increase brightness of selected pixels or groups of pixels may be incorporated in the controller 93 or as an element of the GUI. In some embodiments the user may be provided with control elements to use pixel shift to correct for single pixel's low illumination. When the brightness of a group of pixels is adjusted, the display processor 70 may be configured to implement a smoothing function to prevent the appearance of hard edge.

Combined Resolution Enhancement and Pixel Correction

In some embodiments the display system 25 may be configured to combine pixel correction and resolution enhancement. In such embodiments the ISD 60 may be configured accounting for a pixel layout of display 50, so that cycling between the n image displacements temporally shifts images of one group of pixels into the dark interstitial spaces while shifting images of another group of pixels, or images of the same pixels but in a different state of the ISD 60, into the locations of adjacent pixels for a preceding subframe. The corresponding subframes may be generated by sampling a same visual pattern to be displayed, for example as defied by the corresponding input frame 71, at a sampling grid defined by the pixel layout of the display, and with sampling offsets matching the image shifts imparted by the ISD 60. In some embodiments, subframe pixel intensity data may be adjusted to provide a desired frame image over the sequence of subframes.

Figure 8:
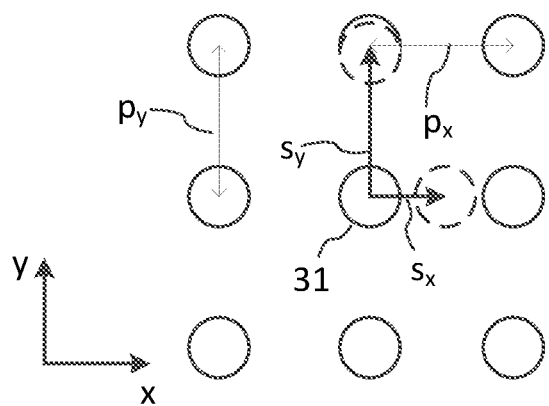
FIG. 8 is a schematic diagram illustrating combined resolution enhancement and pixel correction by dynamic image displacement for a 3×3 pixel array.

With reference to FIG. 8, in some embodiments combined resolution enhancement and pixel correction may include shifting the pixel images in a first direction by a fraction of the pixel pitch in the first direction, and shifting the pixel images in a second direction by a pixel pitch in the second direction. For example, in one embodiment the ISD 60 may be configured to shift the display image in a pixel row direction by a fraction of the pixel pitch $p_x$ in the rows of pixels for displaying a first subframe, and to shift the display image in a pixel column direction by one pixel pitch $p_y$ in the columns of pixels for displaying a second subframe. In another embodiment the ISD 60 may be configured to shift the display image in a pixel column direction by a fraction of the pixel pitch in the column of pixels for displaying a first subframe, thereby enhancing the resolution, and to shift the display image in a pixel row direction by one pixel pitch in the row of pixels for displaying a second subframe, thereby providing a pixel correction capability.

FIG. 8, which shows a 3×3 array of active areas 31 of a square pixel array, illustrates an example embodiment in which the ISD 60 may shift the image by $+\backslash-s_x$ in one direction and/or +\-$s_y$ in another direction. The first image displacement $s_x$ is about half of the pixel pitch $p_x$ in the pixel row direction (x-axis in the figure), and the second image displacement $s_y$ is equal in magnitude to the pixel pitch $p_y$ in the pixel column direction (y-axis in the figure). Thus, performing the first image displacement $s_x$ effectively doubles the pixel density as it appears over two consecutive subframes, while performing the second image displacement $s_y$ enables to correct for defective pixels in any of the rows by temporality substituting a closest working pixel from an adjacent row. In the absence of defective pixels, the ISD controller 80 may operate the ISD 60 to only perform the resolution-enhancing image shifts, i.e. by +\-$s_x$ in the illustrated embodiment, without the pixel-correcting shifts $s_y$.

In some embodiments the pixel pitch in the row and/or column direction may vary along the rows and/or columns, so that shifting the display image in the direction of, for example, the pixel rows shifts some pixels into the dark interstitial spaces and shifts other pixels into adjacent pixel locations in a preceding subframe.

HMD with Dynamic Image Displacement

Example embodiments of a display system 25 will now be described primarily with reference to a head mounted display (HMD) configured for artificial reality applications. It will be appreciated that the image enhancing or correcting approach generally described above, as well as various elements described below with reference to the example embodiments, may also be adopted to other types of display systems including, but not limited to, various projection displays and direct-view displays.

Figure 9:
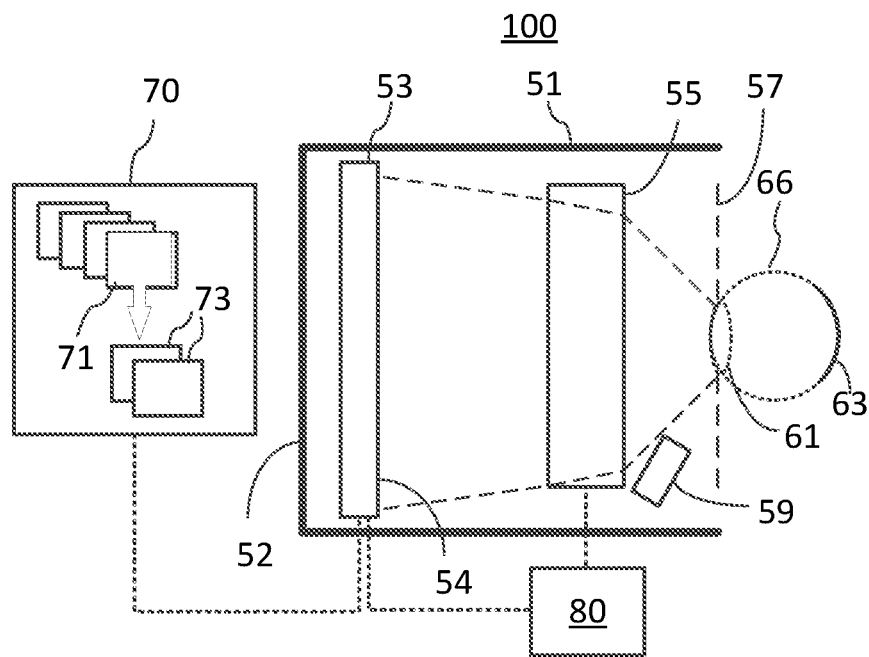
FIG. 9 is a schematic diagram of an example head mounted display (HMD), shown in a cross-sectional view, with dynamic image displacement.

FIG. 9 schematically illustrates a partial cross-sectional view of an example HMD 100 in which the dynamic image displacement for resolution enhancement or defective pixel correction may be implemented. HMD 100 may be an embodiment of the display system 25. HMD 100 includes an electronic display 53 disposed at a frontal side 52 of a rigid body 51, facing an eye box 57. An optics block 55, which is disposed in an optical path between the display 53 and the eye box 57, transmits image light from the display 53 to the eye box 57. The eye box 57 defines the position of an eye 66 of the user when the user wears HMD 100. In one or more embodiments the optics block 55 may form a magnified virtual image of the front light-emitting face 54 of the display 53, typically farther away from the eye box 57 than the display 53. The virtual image of the light-emitting face 54 of the display is then projected by a lens 61 of the eye 60 onto a cornea 63 to form an image thereon. Although only a single optics block 55 is shown, the HMD 100 may include two instances of this block, one for each eye of the user, and may also include two instances of the electronic display 53. The electronic display 53 may be, for example, a micro-display with a total pixel count that may be smaller than, for example, a pixel count of a conventional direct-view LED TV display. HMD 100 may also include various other elements, such as one or more positions sensors, one or more locators, an inertial measurement unit (IMU), and so forth, which may be coupled to the rigid body 51, and in some instances may be at least in part positioned at the frontal side 52 thereof. In one or more embodiments HMD 100 may include one or more cameras 59, which may be configured for eye tracking and/or display calibration, and correspondingly disposed downstream of the optics block 55. The camera(s) 59 may also be disposed upstream the optics block, or be integrated into the optics block 55. The electronic display 53 is a pixelated display that includes an array of active areas, as described hereinabove. The electronic display 53 may be an embodiment of display 50 of FIG. 4. It may be, for example, an LCD display, an OLED display, an AMOLED display, or any other suitable pixelated display. In some embodiments the electronic display 53 may be configured to emit polarized light. In other embodiments the electronic display 53 may be configured to emit unpolarized light. The electronic display 53 may be operationally coupled to a display processor 70, as described hereinabove with reference to FIG. 4. In operation, the electronic display 53 receives image or video data from processor 70, for example in the form of a sequence of input image frames 71 or subframes 73 as described hereinabove, and presents corresponding images to the user by selectively exciting a pattern of active areas at various intensity levels as defined by the subframes 73. The optics block 55 may include one or more optical elements, such as but not exclusively a convex lens, a concave lens, a Fresnel lens, an LC lens, a liquid lens, an aperture, a grating, a filter, a polarizer and/or polarization converter, or any other suitable optical element. The optics block 55 may be configured to form a magnified image of the light-emitting face 54 of the display 53, or an area thereof, and may also correct for optical aberrations and other optical errors in the image light received from the electronic display 53.

In embodiments described herein, the optics block 55, or a portion thereof, may function as an ISD that is configured to dynamically shift an image of at least a portion of the electronic display 53 in synchronization with the electronic display 53 displaying a sequence of subframes 73, generally as described hereinabove with reference to the ISD 60 of the display system 25. In some embodiments an ISD controller 80 may be provided to activate the ISD to perform the image shift in preparation for each new subframe 73 being displayed, for example as described hereinabove with reference to the display system 25. The display processor 70 may be configured to render an input image frame 71 to convert it into two or more subframes 73, which represent the input image frame 71 that is sampled with a varying sampling offset that corresponds to the image shift by the ISD, as described hereinabove.

In some embodiments, the ISD of the HMD 100 may be an electro-optic device configured to shift an image of the display 53, or a portion thereof, by a fraction η of the display pixel pitch. In such embodiments the processor 70 may be configured to render a higher-resolution input image frame 71 into two or more subframes 73 of a lower resolution. In some embodiments this lower resolution may correspond to the pixel layout and density of the electronic display 53, and the subframes 73 may represent a same scene or pattern sampled with an offset or offsets corresponding to the fraction η of the pixel pitch of the electronic display 53. In some embodiments the subframes 73 may be of the same resolution as the input frame 71, but may represent the corresponding scene or pattern sampled at offset grids, with the sampling offset between two subframes 73 corresponding to a pixel pitch of the display 53, or an integer number thereof. In some embodiments two consecutive subframes 73 may each be substantially a same input frame 71 with an offset column or row counter.

ISD Embodiments with Light Steering

Figure 10:
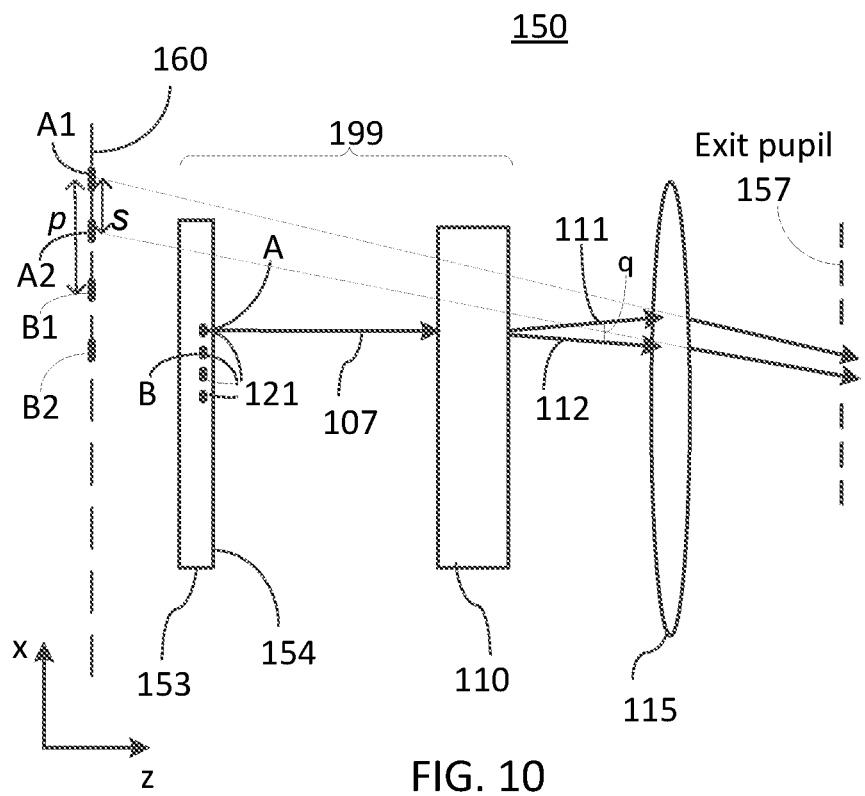
FIG. 10 is schematic diagram of an example display system including a light steering device for dynamic image displacement.

With reference to FIG. 10, an ISD may be implemented as a light steering device (SD) 110 that optically follows an electronic display 153, forming a display module 199. The SD 110 is configured to reversibly impart one or more angular shifts upon image light 107 incident thereon, thereby temporary changing the direction of propagation of the image light. In some embodiments the SD 110 may be optically followed by an optical device or module 115, which may also be referred to below as imaging optics. The optical device or module 115 may be configured to convert these angular shifts to positional image displacements. In some embodiments the optical device or module 115 may be absent or it may be disposed upstream of the SD 110, so that the SD 110 is disposed optically between the optical device or module 115 and the exit pupil 157; in such embodiments the angular shifts imparted upon the image light by the SD 110 may be converted into spatial displacements in the eye of the viewer. A display system 150 schematically illustrated in FIG. 10 may be an embodiment of the display system 25 of FIG. 4, or more particularly an embodiment of HMD 100 of FIG. 10. The electronic display 153 may be disposed with a light emitting face 154 facing generally towards an exit pupil 157. In other embodiments the display system 150 may include one or more optical devices, such as for example one or more prisms, mirrors, waveguides, and the like, that change the direction of propagation of image light 107 emitted by display 153 towards the exit pupil 157. The exit pupil 157 may for example represent the eye box 57 of HMD 100. The light-emitting face 154 of the display 153 includes an array of pixels, each pixel including one or more active areas 121 and may also include an interstitial space or spaces, as generally described hereinabove with reference to FIGS. 2A-3C and 8. The active areas 121 of the display 153 are configured to emit or transmit image light 107 in response to receiving pixel data from a display processor. In some embodiments the light-emitting face 154 of the display 153 may be curved, for example concave. The SD 110 and, when present, the imaging optics 115 may embody the optics block 55 of the display system 100 of FIG. 9, which in some embodiments may also include additional optical elements, modules, and/or devices as desired for suitably conditioning image light 107.

The SD 110 may be configured to be switchable between a first state when it directs the image light in a first direction 111, and a second state when it directs the image light in a second direction 112 that differs from the first direction 111 by an angular shift θ. In some embodiments it may be configured to be switchable between a set of n propagation angles defined by a set of angular shifts $\theta_i$, i=1, 2, . . . n. The switching between different states of the SD 110 may be activated synchronously with a display refresh, for example by a controller such as the ISD controller 80 of FIG. 9.

The imaging optics 115 may be configured to form an image of the display 153, or the pixel array thereof, in an image plane 160. It may be in the form, or include, one or more lenses and/or concave or convex mirrors, and may also include other optical elements. The imaging optics 115 may further be configured to convert each angular shift θ, of the image light into a spatial displacement of the image of the light-emitting face 154 of display 153, or at least a portion thereof, in the image plane 160.

In some embodiments the optical system 150, or a version thereof, may be implemented in a near-eye display system such as HMD 100 described hereinabove. In such embodiments the imaging optics of the optical device 115 may be configured to form a magnified virtual image in the image plane 160 that may be located behind the display 153, as illustrated in FIG. 10. In other embodiments the imaging optics of the optical device 115 may be configured to form real images in an image plane located elsewhere, for example at a screen or a surface disposed downstream from the imaging optics 115. In some embodiments, the image plane 160 may be located substantially at or near the light emitting face 154 of display 153.

The operation of the optical display system 150 may be understood by considering corresponding active areas "A" and "B" of two adjacent pixels 121 of the display 153. When the SD 110 is in the first state, light from active areas "A" and "B" form in the image plane 160 first image pixels A1 and B1, respectively, that are separated by a distance p defined in part by a display pixel pitch. When the SD 110 is in the second state, light from the active areas "A" and "B" forms second image pixels A2 and B2, which are spatially displaced from a corresponding first image pixels A1 or B1 by a distance s. Image pixels corresponding to a single display pixel or active area, such as A1 and A2, or B1 and B2, may be referred to herein as virtual pixels. The intensity of light transmitted by the active areas "A" and "B" of the display 153 during the first state of the SD 110 and the second state of the SD 110 may differ, so that the intensity of light seen from the first virtual pixel A1 (or B1) can be different from that seen from the second virtual pixel A2 (or B2). Therefore, the intensity of the two virtual pixel A1 and A2, or B1 and B2, can be modulated separately.

The SD 110 may be configure to impart upon the image light an angular shift θ that produces, in cooperation with the imaging optics 115 or in the human eye, a desired pixel image displacement s in the image plane. In some embodiments the SD 110 may be configured so that the image shift s is a fraction η<1 of the pixel pitch p in the image plane 160, enabling an effective resolution enhancement over two or more subframes as described hereinabove. For a display 153 with a relatively sparse pixel array, the angular shift by the SD 110 in such embodiments may move the image pixel into a location of a dark interstitial space in the display image before the shift, thereby enabling an effective resolution enhancement and a reduction or elimination of the screen door effect over two or more subframes as described hereinabove. In other embodiments the SD 110 may be configured so that the pixel image displacement s is equal to the pixel pitch p in the image plane 160, or a multiple thereof, so that virtual pixels stemming from different display pixels overlap, thereby enabling a correction of defected pixels as described hereinabove. In some embodiments, for example when the dark interstitial spaces between adjacent image pixels are relatively small, the SD 110 may be configured so that the image shift s is smaller than the width of the image pixel in the direction of the shift, which may also provide a resolution enhancement for a viewer.

In some embodiments two or more instances of the SD 110 may be stacked one after another, so as to temporality impart additional angular shifts upon the image light. In some embodiments different SD instances may be rotated relative to each other, so as to impart upon the image light angular shifts in different planes.

The SD 110 may be implemented in a variety of ways, including but not limited to rotatable mirrors, microelectromechanical systems (MEMs), and electro-optic deflectors that deflect incident light by modifying a phase thereof using an electro-optic effect. One convenient way to implement an electro-optic SD includes using a polarization switch followed by a polarization splitting device. Advantageously, LC implementations of such elements offer a compact and lightweight design.

Figure 11:
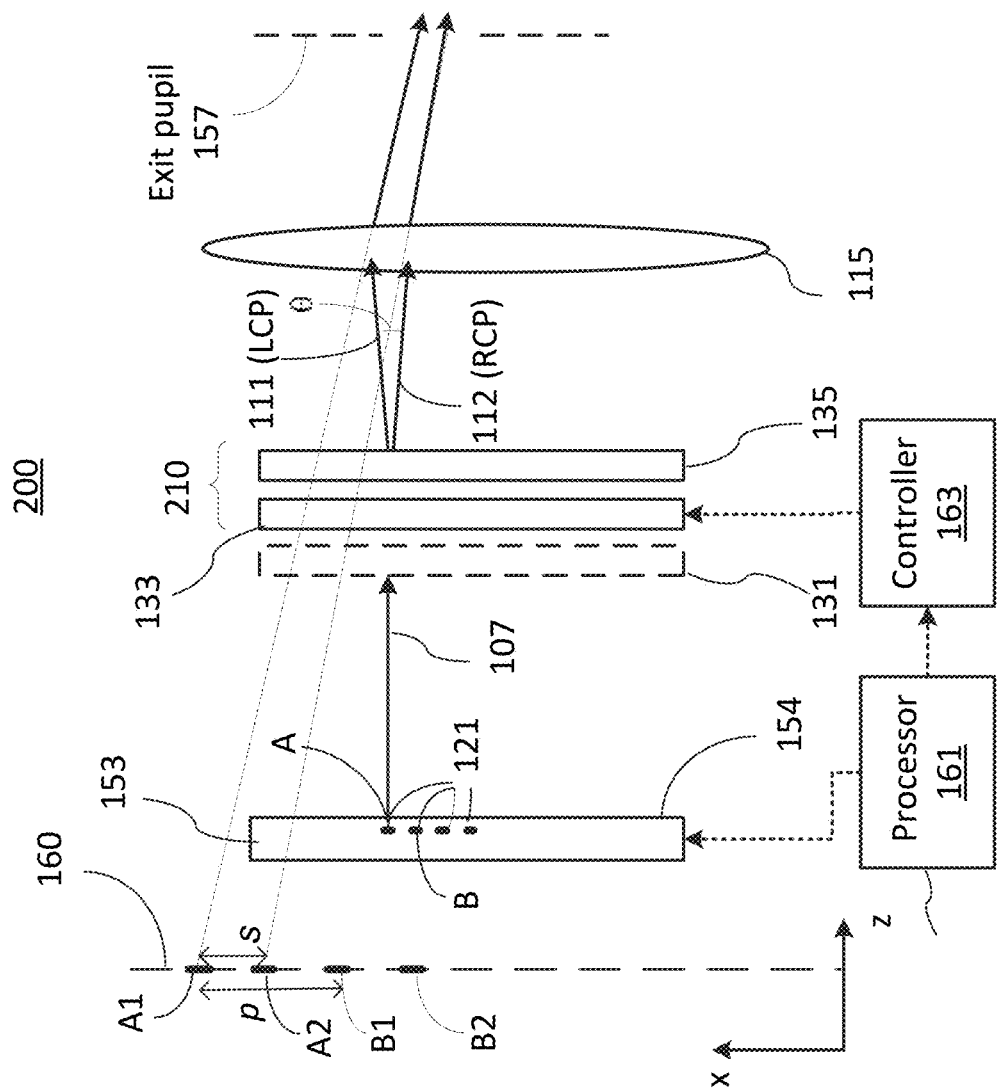
FIG. 11 is a schematic diagram of an embodiment of the display system of FIG. 10 with the light steering device implemented using active LC devices and polarization switching.

With reference to FIG. 11, there is illustrated an optical system 200 including an SD 210 that is implemented with a polarization switch (PS) 133 upstream of a polarization directing device 135. The optical system 200 is an embodiment of the optical system 150, and the SD 210 is an embodiment of the SD 110. The PS 133 is configured to switch image light 107 between a first polarization state S1 and an orthogonal polarization state S2 in response to a control signal from an SD controller 163. The SD controller 163 may be an embodiment of the ISD controller 80 described hereinabove. The polarization directing device 135 is configured to direct the image light it receives in dependence on the polarization state thereof, for example to direct light of the first polarization state S1 in a first direction 111 and to direct light of the second polarization state S2 in a second direction 112, with an angular shift θ therebetween.

In some embodiments the polarization directing device 135 may be a polarization grating, for example an LC polarization grating as described hereinabove with reference to FIG. 1C and FIG. 1D. In some embodiments PS 133 may be in the form of an electrically-controlled waveplate, for example half-wave plate (HWP), that is switchable between a zero-retardance state and a half-wave retardance state. In some embodiments PS 133 may receive the image light 107 as polarized light in the first polarization state S1, and operates to either transmit it without change, or to temporarily switch it to the second polarization state S2. In some embodiments PS 133 may be preceded by a polarization conditioning device 131 that receives the image light 107 and conditions it to the desired input polarization of the polarization switch 133, for example S1. The polarization conditioning device 131 may be for example in the form, or include, a polarizer and/or a polarization converter. PS 133 may also be referred to herein as the first polarization switch, and the polarization directing device 135 may also be referred to herein as the first polarization directing device.

In one or more embodiments the image light 107 received by PS 133 is circular polarized, and PS 133 is in the form of an active LC HWP that can switch between an ON state and an OFF state, in one of which PS 133 transmits the image light "as is" and in the other it switches input circular polarization to the circular polarization of the opposite handedness, for example as described hereinabove with reference to FIGS. 1A, 1B. In embodiments wherein display 153 emits unpolarized light, the polarization conditioning element 131 may be a circular polarizer. In embodiments wherein display 153 emits linearly polarized light, the polarization conditioning element 131 may be in the form of a polarization converter such as a QWP.

The polarization directing element 135 may be for example a PBP grating, such as an LC PBP grating as described hereinabove with reference to FIG. 1C, and may be configured to deflect RCP light by a diffraction angle $\theta_d$ while converting it to LCP light, and to deflect LCP light in the opposite direction, generally by the same diffraction angle value $\theta_d$, but different direction and in a same plane, while converting it to RCP light, for example as described hereinabove with reference to FIG. 1D.

The display system 200 may operate generally as described hereinabove with reference to display systems 25, 100, and 150. In one embodiment the electronic display 153 receives image data from a display processor 161 in the form of subframes 73 and displays them in sequence at the display frame rate r. The display processor 161 may operate generally as described hereinabove with reference to FIGS. 4-7 and 9. The polarization switch 133 is switched ON and OFF by the SD controller 163 at the display frame rate r synchronously with the subframes displayed by the electronic display 153. For example PS 133 may receive LCP light, and be in a zero-retardance state while a first video subframe is displayed by display 153. In this state, a pixel A may be seen as a virtual pixel A1 in the image plane 160. As display 153 undergoes a refresh operation whereby it switches to displaying a next subframe, PS 133 is switched by the controller 163 to the HWP state. In the HWP state PS 133 converts the polarization state of the transmitted light from LCP to RCP, which the polarization grating 135 steers in a somewhat different direction by imparting a relative angular shift $\theta = 2\theta_d$, resulting in the image shift s in the image plane 160. With the PS 133 in the HWP state, pixel A may appear as a virtual pixel A2 in the image plane 160.

The direction in which the image light is steered by the SD 210, and thus the direction of the image shift s relative to the pixel rows and columns in the image, depends on the rotational orientation of the polarization grating 135 about its optical axis, and may be changed by suitably rotating the polarization grating 135. In various embodiments the direction of the image shift s may be aligned with either rows or columns of the pixel array, or may not be aligned with either.

Figure 22:
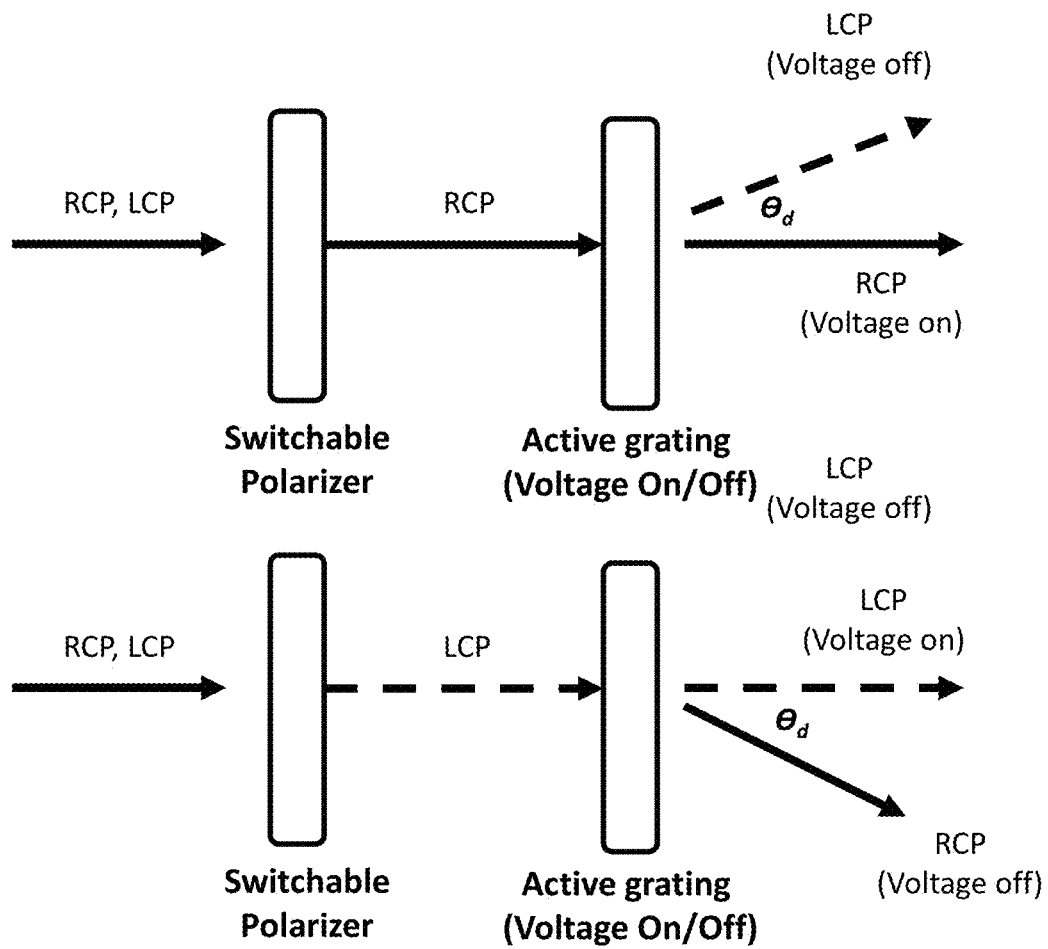
FIG. 22 is a schematic diagram illustrating the operation of a light steering device with an active polarization grating in accordance with an embodiment.

In some embodiment the polarization grating 135 may be an active polarization grating that is switchable between an ON state and an OFF state, and which operates as a simple transmissive element in one of these states. In such embodiment the SD 210 may be a 3-state device that is operable to form three virtual pixels for each display pixel over a sequence of three subframes, which enables increasing the effective image resolution by up to three times with an effective frame rate of r/3. By way of example in an embodiment where PS 133 is an active LC HWP and the polarization grating 135 is an active LC PBP grating, two virtual pixels may be formed as described above when no voltage is applied to the active LC PBP grating 135, i.e. by switching PS 113 ON and OFF to deflect the image light by either $+\theta_d$ or $-\theta_d$. A third virtual pixel may be formed half-way between the two virtual pixels by applying a suitable voltage to the active LC PBP grating 135, so that it does not diffract incident light, either LCP or RCP. The operation of the SD 210 with an active LC PBP grating is illustrated in FIG. 22.

The diffraction angle $\theta_d$ is defined by the grating pitch, and may be for example in the range of about $1.5 \cdot 10^{-5} \sim 3$ degree but values outside of this range are not excluded. A target value of the diffraction angle $\theta_d$ may be selected for a particular pixel array of the display 153 in dependence on the location of the polarization grating 135. In embodiments wherein the SD 210 is placed next to the display 153 in the absence of lens elements therebetween, the target diffraction angle $\theta_d$ may be selected based on the distance between the display 153 and the polarization grating 135 and the display pixel pitch. In embodiments wherein the SD 210 is disposed downstream of the imaging optics 115, the target diffraction angle $\theta_d$ may be selected based on the pixel image pitch p and the distance between the polarization grating 135 and the image plane 160. By way of example, in one embodiment a polarization converting element 131 such as a QWP, an active LC HWP 133, and an LCP PBP 135 may be placed, e.g. laminated, directly onto the light emitting face 154 of the display 153 to form a beam steering assembly of a total thickness of 2.15 microns (μm). If the pixels of display 153 are arranged in a square array with the diagonal pixel pitch $p_d$=77.6 microns (μm), the LC PBP grating 135 may be configured to provide an image shift corresponding to $p_{display}/3$=25.87 μm. The LC PBP grating 135 in such embodiment may be configured to provide the relative deflection angle $\theta = 2\theta_d$ between the RCP and LCP light directions equal to about 0.69 degree, which at λ=530 nm may correspond to a grating period Λ=88.33 μm.

Figure 12A:
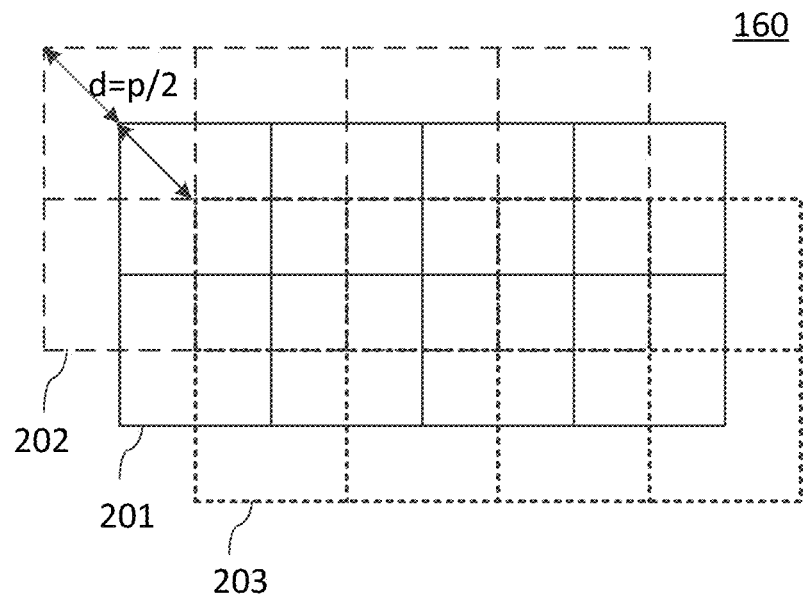
FIG. 12A is a schematic diagram illustrating the shifting of pixel images by +\−½ of a pixel pitch for the systems of FIGS. 10 and 11 to form offset subframe images with overlapping pixels.

FIG. 12A schematically illustrates, by way of example, image plane positions of images 202, 203 of a same 2×4 grouping of adjacent square pixels of display 153 for the two states of PS 133, relative to a position 201 of the grouping's image in the absence of the SD 210 or the LC polarization grating 135, or when the SD 210 is in a state where it doesn't change the direction of the image light 107. Images 202, 203 may be said to belong to two subsequent subframe images. In the illustrated embodiment the SD 210, in cooperation with the imaging optics 115, shifts pixel images along their diagonals by +\-p/2, where p is the pixel pitch as measured along the diagonals of the pixel array in the image plane. The desired direction of the image shifts relative to the pixel rows and columns in the image is controlled by the orientation of 'grooves' of the LC polarization grating 135, as defined by the pattern of LC molecules orientation in the plane of the grating, and may be varied by rotating the polarization grating 135 about its optical axis. By way of example the subframe image position 202 may correspond to PS 133 outputting RCP light, and the subframe image position 203 may correspond to PS 133 outputting LCP light.

Figure 12B:
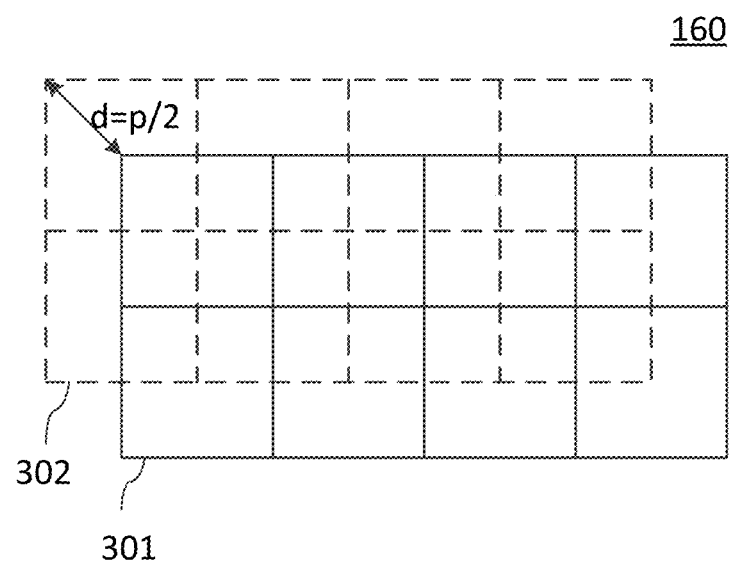
FIG. 12B is a schematic diagram illustrating the shifting of pixel images by +\−¼ of a pixel pitch for the systems of FIGS. 10 and 11 to form offset subframe images for increased effective image resolution in a compound image.

Referring to FIG. 12B, there are schematically illustrated positions in the image plane 160 of images 301, 302 of the 2×4 pixel grouping for the two states of the PS 133 in an embodiment wherein the beam steering optics 210, in combination with the imaging optics 115, shift the virtual pixel images along their diagonals by +\-p/2, or +\-p/4 relative to a pixel image position in the absence of the SD 210, where p is the pixel pitch as measured along the diagonals. Images 202, 203 may be said to belong to two subsequent subframe images. By way of example subframe image 301 may correspond to PS 133 outputting RCP light, and subframe image 301 may correspond to PS 133 outputting LCP light.

Figure 13:
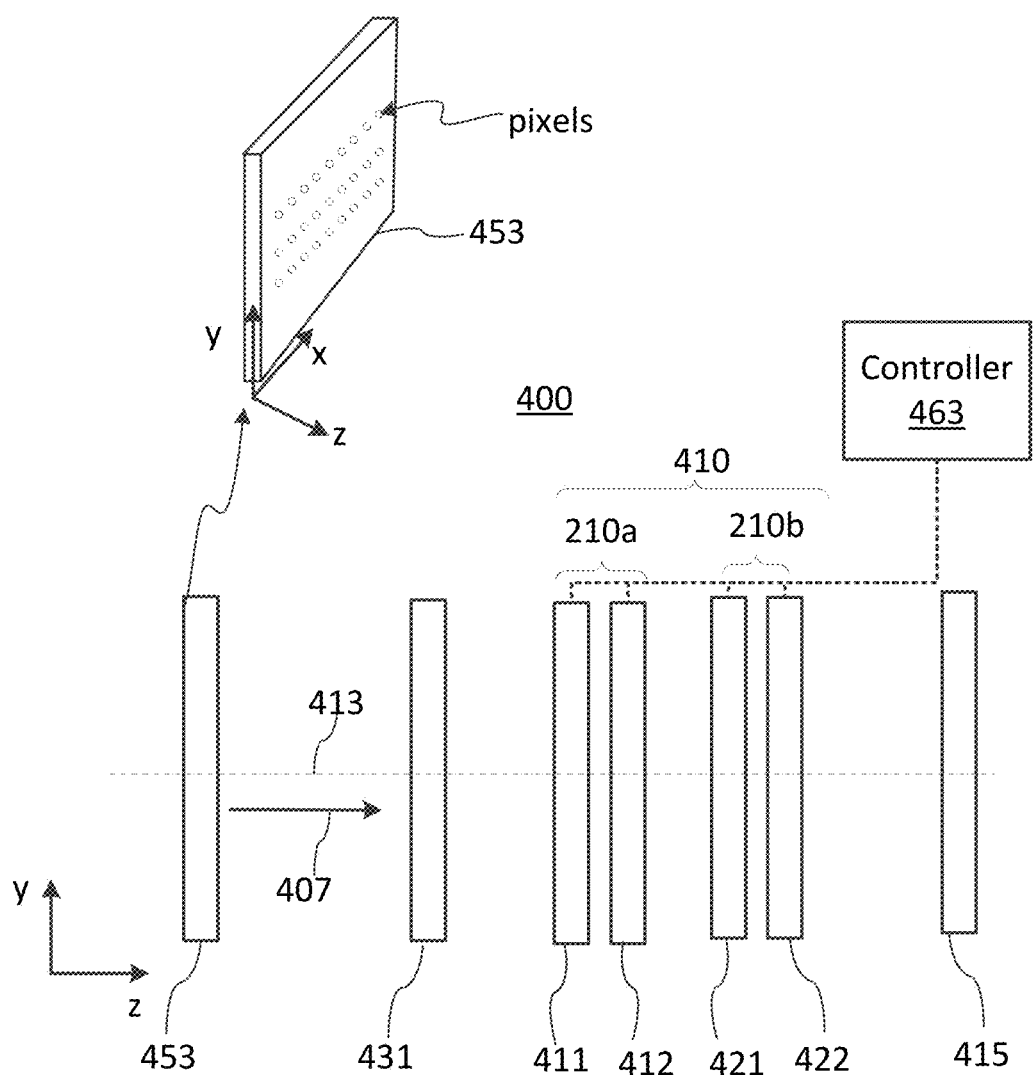
FIG. 13 is a schematic diagram of an example display system with a multi-state-state light steering device in the form of a stack of polarization switches and polarization gratings.

Turning now to FIG. 13, the total number of virtual pixels that may be obtained from each pixel of an electronic display may be increased, for example, by using an SD stack 410 that includes two instances of an SD of the type illustrated in FIG. 11. FIG. 13 schematically illustrates a display system 400 that may be viewed as a variant of the display system 200 of FIG. 11 with the SD 210 replaced by the SD stack 410. The display system 400 may generally operate as described hereinabove with reference to FIGS. 10 and 11, except that the SD stack 410 is switchable between a greater number of angular shifts, resulting in a more dense or diverse constellation of virtual pixels that may be obtained from a single display pixel. The SD stack 410, which may be a part of an optics block of the display system 400, receives image light 407 from an electronic display 453 that may be similar to the electronic display 153 of FIGS. 10 and 11. A polarizer or polarization converter 431 may be provided to convert the image light 407 from the display 453 to polarized light, for example into LCP or RCP light. Imaging optics 415, which may be similar to the imaging optics 115 of FIGS. 10 and 11, is configured to convert angular shifts imparted by the SD stack 410 upon the image light 407 into spatial displacements $s_t$ in an image plane. Imaging optics 415 may be absent in some embodiments, or may be disposed upstream of the SD stack 410, i.e. between the SD stack 410 and the display 453. The SD stack 410 is formed of a first SD 210a that is optically followed by a second SD 210b. The first SD 210a includes a first polarization grating 412 disposed in sequence with a first PS 411. The second SD 210b includes a second polarization grating 422 disposed in sequence with a second PS 421. The second polarization grating 422 may be disposed with a rotational offset about an optical axis 413 relative to the first polarization grating 412 so that the SD 201a and 210b impart angular shifts upon image light in two different planes. Thus the "grooves" of the second polarization grating 422 may be oriented at an angle, for example 90 degrees, relative to the "grooves" of the first polarization grating 412. Each of the first and second SD 210a, 210b may be either a 2-state device or a 3-state device, depending on whether it includes an active polarization grating or a passive polarization grating. Accordingly, in various embodiments the SD stack 410 may be configured to be switchable between 4, 6, or 9 different states.

Figure 14:
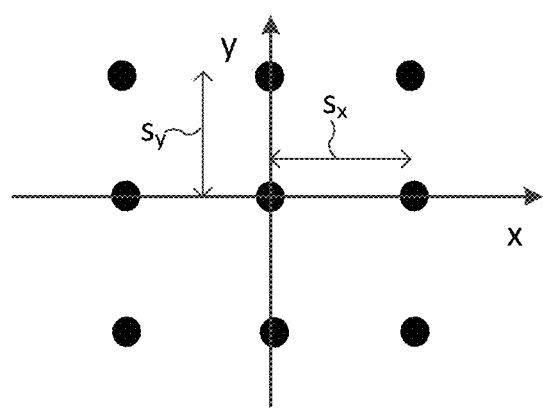
FIG. 14 is a diagram representing a constellation of virtual pixel images in the display system of FIG. 13 for 9 different switching states of the multi-state light steering device.

Table 1 illustrates different switching states of an example embodiment of the SD stack 410 with two active polarization gratings. In this embodiment each of the first and second PS 411, 421 is a voltage-controlled switchable HWP, for example an active LC HWP, that has a half wave retardance in the absence of voltage, i.e. in the OFF state, and has a substantially zero retardance in an ON state when a suitable voltage is applied. Each of the first and second polarization gratings 421, 422 is an electrically-controlled active LC PBP grating, which in the ON state, i.e. when a voltage is applied thereto, may operate as a simple transmissive element that neither deflects light nor discriminates between polarizations. In other embodiments with different LC materials the actions of the active LC elements 411, 412, 421, 422 in the ON and OFF states may be reversed. A controller 463 may be provided that is in an electrical communication with each of the active LC elements 411, 412, 421, 422, and is configured for switching each of them ON and OFF in any desired order. The controller 463 may be an embodiment of the ISD controller 80 described hereinabove, and may be configured to active the SD stack 410 to switch synchronously with display 453 refreshing to display a next subframe. In Table 1, "PS1" and "PS2" indicate the first PS 411 and the second PS 421 respectively, and "PG1" and "PG2" indicate the first polarization grating 412 and the second polarization grating 422, respectively. The first polarization grating 412 may be oriented to deflect light in the (x,z) plane by an angle $\pm\theta_x$ when turned off, which may result in an image displacement by +\-$s_x$ in a display system. The second polarization grating 422 may be oriented to deflect light by an angle $\pm\theta_y$ in the (y,z) plane when turned off, resulting in an image displacement by +\-$s_y$ in an orthogonal dimension. The deflections angles $\theta_x$ and $\theta_y$ are independently controlled by the design of the respective LC polarization gratings 412, 422 and may be either equal or different, depending on a particular system implementation and the geometry of the pixel array of the display 453. Setting active LC elements 411, 412, 421, 422 turned ON and OFF in 9 different combinations indicated in Table 1 results in a constellation of 9 virtual pixel positions indicated in FIG. 14. Polarization gratings 412, 422 may be configured for each specific configuration of the display system to provide the deflection angles $\theta_x$, $\theta_y$ for which the constellation of the virtual pixels has a desired size in an image plane of the display system.

By switching the SD stack 410 between these 9 states, light from a single active area of display 453 may be directed at any one of the nine different deflection angles listed in the last column of Table 1, so that one display active area may be imaged or projected at up to nine different locations in an image plane of system 400. It will be appreciated that the subframes in the first column of Table 1 are numbered in no specific order, and the sequence of switching may be different than that indicated in Table 1.

TABLE 1

| Sub-Frame # | PS1 | PG1 | PS2 | PG2 | angle |
|---|---|---|---|---|---|
| 1 | off | off | off | on | $+\theta_x$ |
| 2 | on | Off | Off | on | $-\theta_x$ |
| 3 | off | On | Off | off | $+\theta_y$ |
| 4 | on | On | Off | off | $-\theta_y$ |
| 5 | off | On | On | On | $+\theta_x+\theta_y$ |
| 6 | off | On | Off | on | $+\theta_x-\theta_y$ |
| 7 | on | On | Off | on | $-\theta_x+\theta_y$ |
| 8 | on | On | On | on | $-\theta_x-\theta_y$ |
| 9 | off/on | off | Off/on | off | 0 |

In some embodiments the display system 400 may be operated to sequentially image a single display active area to nine different 'virtual pixel' locations synchronously with displaying a sequence of nine consecutive subframes. Each of the nine subframes may represent a same visual pattern, or a same full-resolution image frame, that is sampled or sub-sampled in accordance with the resolution and the pixel layout of the pixelated display 453, and with a sampling offset corresponding to one of the image shifts or displacements d $s_x$, $s_y$ defined by the constellation of virtual image pixels illustrated in FIG. 14. In embodiments wherein one or both of the image pixel displacements $s_x$, $s_y$ is a fraction of a pixel pitch in a corresponding direction in the image plane, the displacement may place some or all of the virtual image pixels of one subframe 73 in the dark interstitial spaces of a preceding subframe 73. Cycling through these 9 displacements, or a subset thereof, for each full-resolution input image frame 71 may enable up to 9 times higher effective image resolution, with an effective frame rate R=r/9. In some embodiments cycling the SD stack 410 between the 9 possible states, or a selected subset of these states, may temporally move image pixels associated with two or more adjacent display pixels into a same spatial position, thereby providing pixel redundancy and enabling correction of defective pixels.

Example Display Pixel Layouts

The layout of the pixel array of the electronic display 50, 53, 153, or 453 may be configured to facilitate a desired combination of the resolution enhancement and pixel redundancy/correction capabilities when using a dynamic image displacement of the type described hereinabove. In embodiments of an electronic display with rectangular arrays of pixels, the pixel pitch may vary between the pixel rows and columns, and may also vary across the display in either row or column direction, or both. Display pixel layouts may be envisioned in which shifting an image of the array by a distance corresponding to a particular pixel pitch may cause some image pixels after the shift to substantially overlap adjacent image pixels prior to the shift, thereby enabling a pixel correction function, while also shifting other image pixels into interstitial positions between two adjacent image pixels prior to the shift, i.e. in a preceding subframe, thereby enabling resolution enhancement. FIGS. 15-18 illustrate pixel correction and resolution enhancement capabilities of a display system with a 9-state SD stack of the type illustrated in FIG. 14 for four example pixel layouts of an electronic display.

Figure 15:
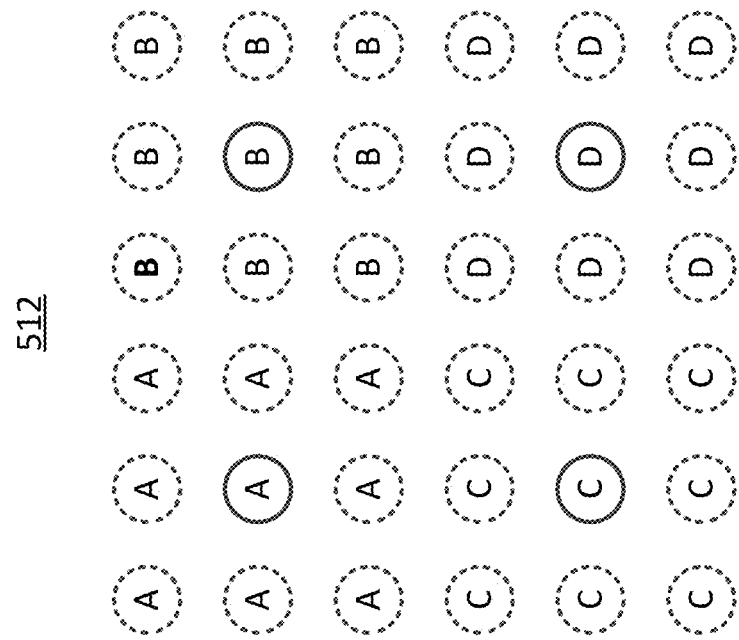
FIG. 15 is a diagram illustrating effective resolution enhancement that may be provided by a light steering device of FIG. 13 for an example square array with large interstitial spaces.
Figure 15:
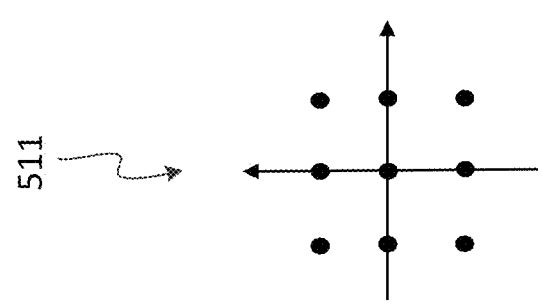
Figure 15:

FIG. 15 illustrates a 2×2 group 510 of four adjacent pixels of a display with a relatively sparse square pixel array layout. The light emitting areas of the four shown pixels are labeled A, B, C, and D. Each of these light emitting areas shown may comprise one active area or several active areas that may be of different colors. Using an SD stack 410 aligned to shift pixel images along the pixel row and column directions by one third of the pixel pitch, as indicated at 511, each 2×2 pixel group 510 may be transformed to a 6×6 array of virtual pixels 512 in a compound image. The pixel image locations in the absence of image shifting are indicated with solid circles. Shifted virtual pixels are shown as dotted circles with letters indicating the physical pixels, or light emitting areas, they originate from. This configuration provides 9× resolution enhancement without redundancy for pixel repair. In the example embodiment shown, the pixel interstitial spaces are large enough to accommodate three light-emitting areas of each pixel along both pixel rows and columns, and image pixels do not overlap.

Figure 16:
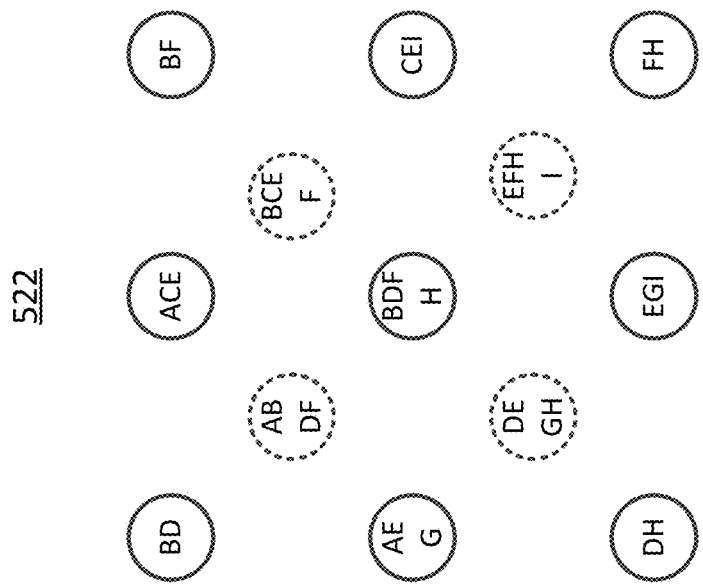
FIG. 16 is a diagram illustrating combined pixel redundancy and effective resolution enhancement capabilities that may be provided by a light steering device of FIG. 13 for an example square array with smaller interstitial spaces.
Figure 16:
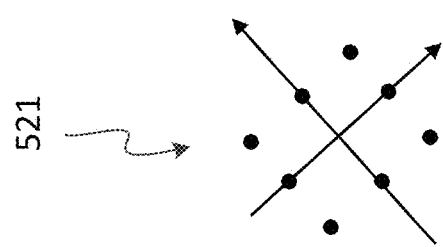
Figure 16:
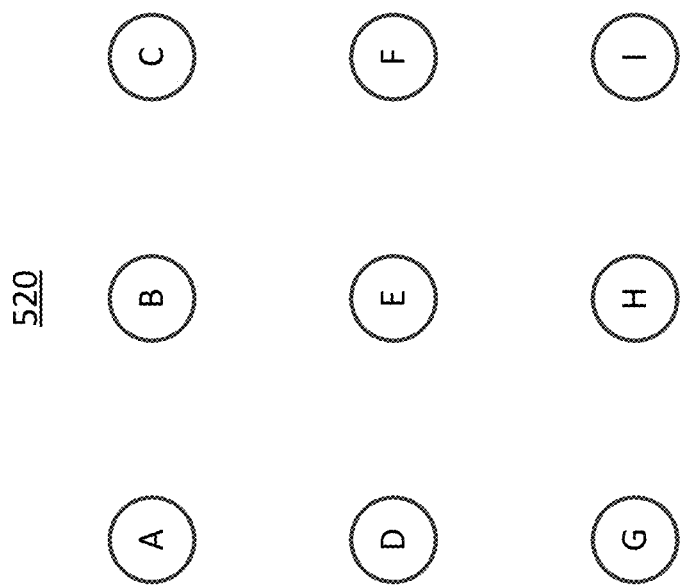

FIG. 16 illustrates a 3×3 group 520 of adjacent pixels of a display with a square pixel array layout in which pixel interstitial spaces along a diagonal of the array may be large enough to accommodate an additional light-emitting area. The light emitting areas of the six shown pixels are labeled A to I. Each of these light emitting areas shown may comprise one active area or several active areas of different colors. Using an SD 410 aligned to shift pixel images along the diagonal directions of the pixel array by one half of the pixel pitch along the diagonal, switching between 8 of the 9 states as indicated at 521 transforms the 3×3 pixel group 520 into a centered square array 522 of virtual pixels. The image pixels locations in the absence of the dynamic image shifting are indicated with solid circles. Shifted virtual pixels are shown as dotted circles with letters indicating the physical pixels or active areas they originate from. This configuration may provide 2× resolution enhancement with 4× pixel redundancy for pixel repair.

Figure 17:
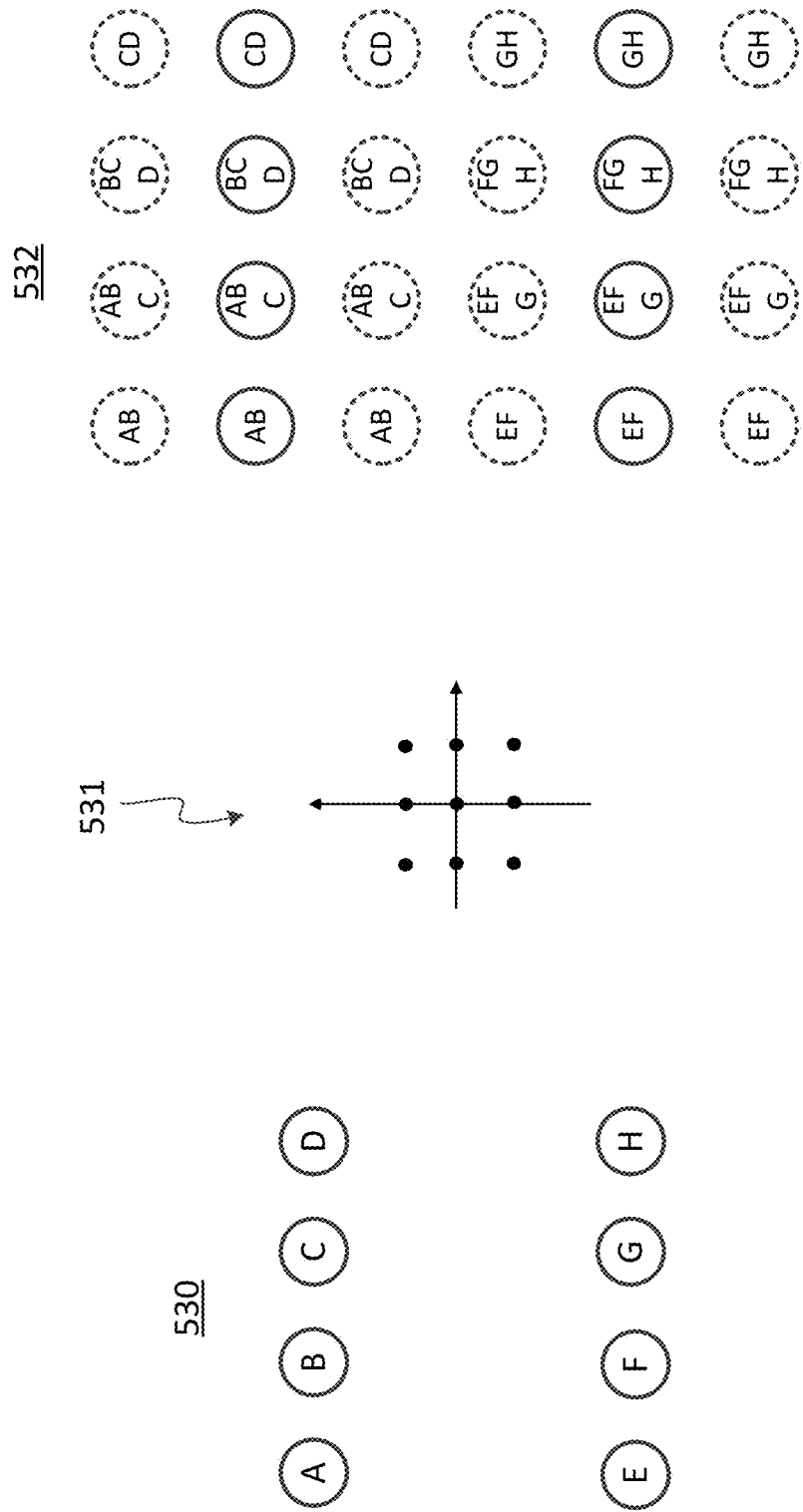
FIG. 17 is a diagram illustrating combined pixel redundancy and effective resolution enhancement capabilities that may be provided by a light steering device of FIG. 13 for an example square array with large interstitial spaces between densely-packed pixel rows.

FIG. 17 illustrates a 4×2 group 530 of adjacent pixels of a display with a dense packing of pixel light-emitting areas along the pixel rows, but with larger interstitial spaces in the pixel columns. In the illustrated example they are shown large enough to accommodate two additional light-emitting areas for clarity. The light emitting areas of the eight shown pixels are labeled A to H and are disposed in two rows. Each of these light emitting areas shown may comprise one active area or several active areas of different colors. Using an SD 410 configured to shift pixel images by one pixel pitch in the rows direction and by one third of a pixel pitch in the columns direction as indicated at 531, each 4×2 pixel group 530 may be transformed to a 4×6 array of virtual pixels 532. The pixel image locations in the absence of image shifting are indicated with solid circles. Shifted virtual pixels are shown as dotted circles with letters indicating the physical pixels they originate from. This configuration may provide 3× resolution enhancement in a compound image with 3× pixel redundancy for pixel repair.

Figure 18:
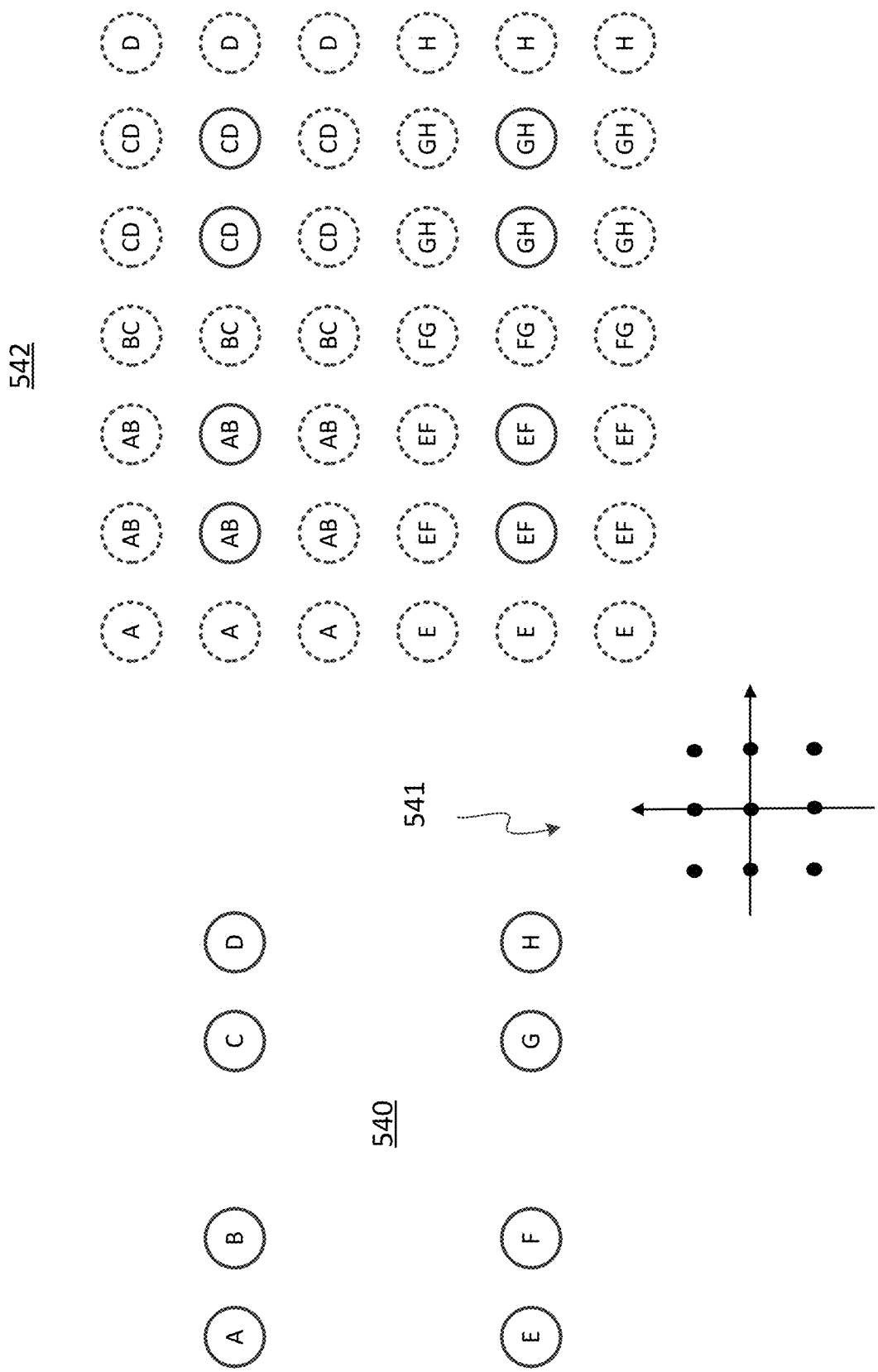
FIG. 18 is a diagram illustrating combined pixel redundancy and effective resolution enhancement capabilities that may be provided by a light steering device of FIG. 13 for an example square array with varying pixel pitch in pixel rows or columns.

FIG. 18 illustrates a 4×2 group 540 of adjacent pixels of a display with a pixel array layout that is similar to the display pixel layout of FIG. 17, but with each third pixel in each row removed. The light emitting areas of the eight shown pixels are labeled A to H and are disposed in two rows. Each of these light emitting areas shown may comprise one active area or several active areas of different colors. A pixel row in this layout is formed of pairs of pixels with closely spaced active areas that are separated by interstitial spaces that may be large enough to accommodate another light-emitting area. Using an SD 410 configured to shift pixel images by one pixel pitch in the rows direction and by one third of a pixel pitch in the columns direction, as indicated at 541, the 4×2 pixel group 540 may be transformed to a 7×6 array of virtual pixels 542. The pixel image locations in the absence of image shifting are indicated with solid circles. Shifted virtual pixels are shown as dotted circles with letters indicating the physical pixels or active pixel areas they originate from. This configuration may provide 4.5× resolution enhancement with 2× pixel redundancy for pixel repair.

Figure 19:
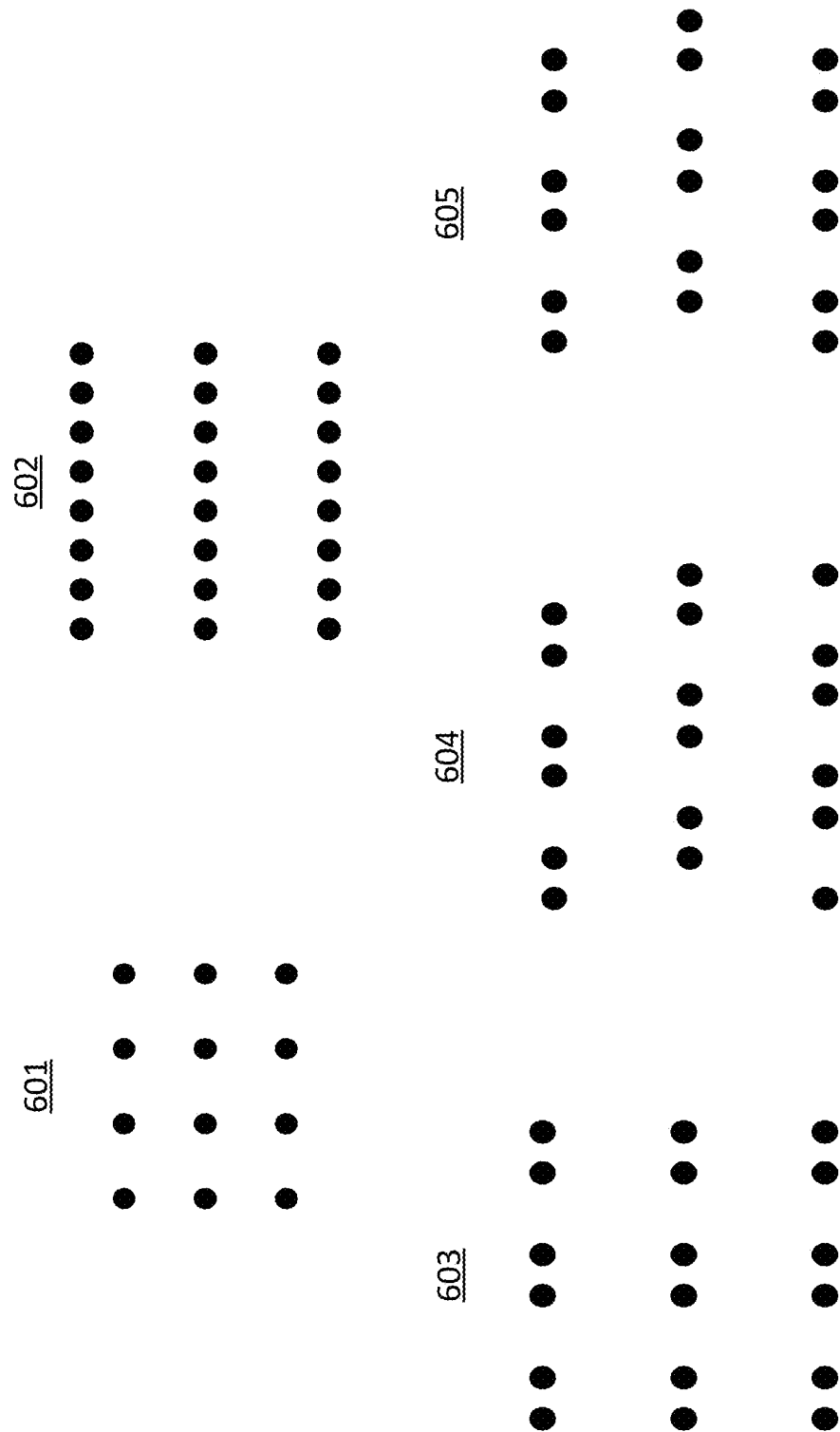
FIG. 19 is a diagram of example pixel layouts amenable for effective resolution enhancement and/or pixel redundancy by dynamic image displacement.

FIG. 19 schematically illustrates example pixel layouts of an electronic display for which a dynamic image displacement of the type described hereinabove may facilitate an effective resolution enhancement and/or pixel redundancy; other layouts may also be envisioned. Pixel layout 601 is a sparse square array with dark interstitial spaces between active areas of adjacent pixels in both row and column directions can at least partially accommodate an additional active area. This layout is amenable to both resolution enhancement and pixel correction by a dynamic image displacement in either the row or column direction. Pixel layout 602 is a rectangular array with dense pixel rows and relatively sparse pixel columns. This layout may be amenable to resolution enhancement in the column direction and pixel correction in the rows direction. Pixel layouts 603, 604, and 605 are different versions of the layout of FIG. 18, with each pixel row formed of pairs of pixels with closely spaced active areas that are separated by relatively larger interstitial spaces. With these layouts, a dynamic image displacement may be used to combine resolution enhancement and pixel correction in the rows direction.

Embodiments described hereinabove are by way of example only; they are illustrative rather than restrictive, and various modifications thereof and other embodiments will become evident to those skilled in the art having the benefit of the present disclosure. For example, although the effective resolution enhancement by dynamic image shifting has been described above with reference to pixel arrays having relatively large interstitial spaces that can accommodate one or more active areas of a pixel, this is however not a requirement. A dynamic image shifting by a fraction of a pixel pitch may be used to enhance effective image resolution for pixel arrays with densely packed active areas, in which active areas may exceed in size interstitial spaces separating them. Although in such embodiments image pixels in one subframe may partially overlap with corresponding image pixels in a next subframe, the viewer may still perceive a resolution enhancement in the compound image of the two subframes.

Broad-Band and Off-Axis/Oblique Angle Operation

Figure 20:
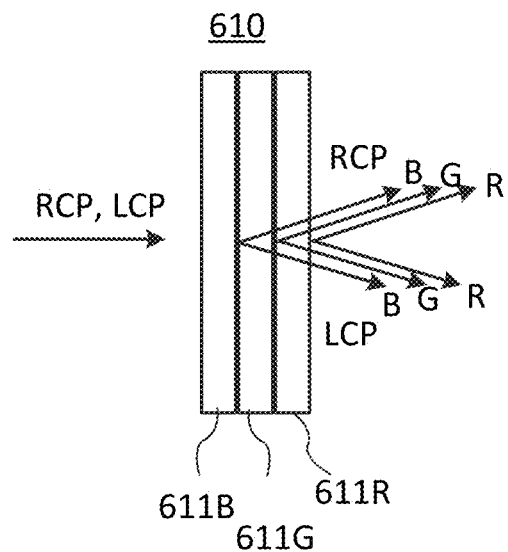
FIG. 20 is a schematic diagram of an LC PBP gratings with reduced wavelength sensitivity.

In some embodiments, the polarization devices described herein may be modified to reduce their wavelength dependence. Generally the performance of the PS 133, 411, 421 and the polarization gratings 135, 412, 422 may vary with the wavelength of incident light, so that these elements may perform slightly differently for light of different color bands that may be emitted by the corresponding display. For example, the retardance of an LC layer of an LC waveplate or an LC PBP grating is wavelength-dependent; thus, LC devices 133, 135, 411, 412, 421, 422 that are designed to operate, for example, in one wavelength band of the display light, may not operate optimally for another wavelength band that may be present in the display light. Accordingly, in some embodiments the light steering devices 110, 210, 210a, 210b and the like may be modified to reduce the dependence of their performance on the wavelength across a desired spectral range, such as in the visible spectrum. In such embodiments each of the light steering devices 110, 210, 210a, 210b may be composed of two or more groups of LC devices. Each of these groups of LC devices may be configured to operate as described hereinabove within a specific wavelength band, which is however different for different groups of the LC devices, and be simply transmissive in the other wavelength bands. For example, display 153 or 453 may emit RGB light that is composed of red (R) light, green (G) light, and blue (B) light. A light steering device with a reduced sensitivity to the wavelength may then include a stack of three active or passive LC PBP gratings. As illustrated in FIG. 20 by way of example, an LC polarization grating stack 610 with a reduced wavelength sensitivity may include a first LC PBP grating 611B having a retardance of an odd number of half-wavelengths of blue color channel to operate as a HWP for B light but as an nWP for the G and R light, a second LC PBP grating 611G having a retardance of an odd number of half-wavelengths of green color channel to operate as a HWP for G light but as an nWP for the R and B light, and a third LC PBP grating 611R having a retardance of an odd number of half-wavelengths of red color channel to operate as a HWP for the R light but as an nWP for the G and B light. In this configuration, the first LC PBP grating 611B diffracts the B light by a polarization dependent angle, while transmitting the G and R light without change in direction; the second LC PBP grating 611G diffracts the G light by the same polarization dependent angle, while transmitting the B and R light without change in direction; the third LC PBP grating 611R diffracts the R light by the same polarization dependent angle, while transmitting the G and the B light without change in direction. In other embodiments the LC grating stack 610 may have a same or different number of LC gratings designed for other wavelength bands. Similarly, the active LC HWP 133, 411, 421 in front of an LC grating or an LC grating stack in an SD may be composed of three color-specific active LC HWPs, each designed to operate as an nWP for the color bands other than its target color band.

Furthermore, generally the polarization performance of LC devices such as those described hereinabove with reference to active LC HWPs 133, 211, 221 and the LC polarization gratings 135, 212, 222 may depend on the angle of incidence, with the device retardance typically being reduced for light that is incident at an oblique angle. Accordingly, in some embodiments the polarization switches and/or polarization gratings described hereinabove may include additional birefringent plates or retardation sheets, such as C-plates, which retardance increases at oblique angles of incidence, thereby reducing or eliminating the dependence of the performance of the respective polarization device on the angle of incidence of image light.

Figure 21:
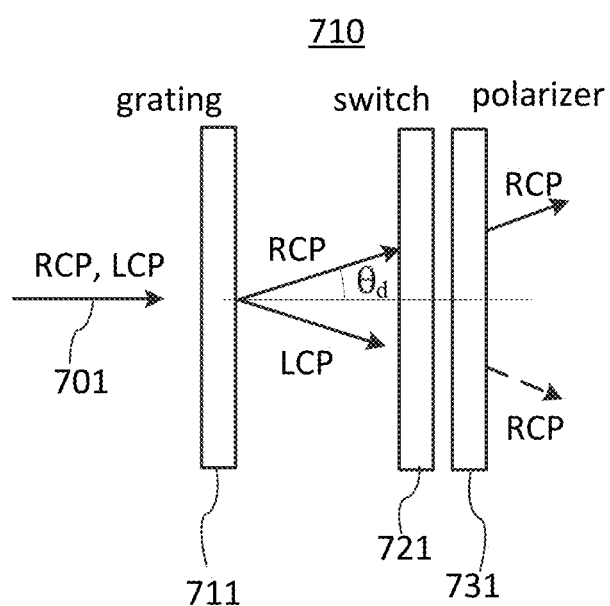
FIG. 21 is a schematic diagram of a light steering device with a polarization switch downstream from a polarization grating.

Furthermore, although example embodiments of an SD described hereinabove include a polarization switch upstream from a polarization grating, in some embodiments an SD may include a polarization switch that is disposed downstream from a polarization grating, and optically followed by a polarizer. FIG. 21 illustrates an example SD 710 in which an LC PBP grating 711 is followed by an active HWP 721, which is followed by a CP polarizer 731 that transmits only one of LCP light or RCP light, while blocking the other. SD 710 may operate as a directional switch/polarizer for unpolarized light 701. For example the LC PBP grating 711 may split unpolarized light 707 into RCP and LCP components, diffracting the RCP light at a diffraction angle $+\theta_d$ and the LCP light at a diffraction angle $-\theta_d$. The CP polarizer 731 may be for example transmissive to the RCP light while blocking LCP light. The PS 721 is switchable between a first state where it has zero retardance, and a second state in which it has the half-wave retardance. In the first state of PS 721, SD 710 outputs the RCP light at a the diffraction angle $+\theta_d$. In its second state PS 721 flips the polarization states of the RCP and LCP light diffracted by grating 711, so that the SD 710 outputs RCP light at a the diffraction angle $-\theta_d$. The configuration in FIG. 21 may be used, for example, in a polarization sensitive optical device or module, such as polarization folded optics.

Furthermore, although example embodiments of an SD described hereinabove were described primarily with reference to LC PBP gratings, in some embodiments the polarization gratings described hereinabove may be in the form of an active or passive volume holographic grating. For example each of the LC PBP gratings 135, 412, 422 may be replaced by an LC volume holographic grating, active or passive. Such gratings may be configured to deflect one of two orthogonal linear polarizations of light by angles of different magnitudes, or to let the other to propagate without deflection while deflecting the other.

Furthermore, in some embodiments a light or image steering device or switch may be configured to steer only a selected portion of the image light, such as light transmitted from a selected portion of the display area, so that the subframe images may include portions or areas that do not undergo a positional or angular shift between subframes.

Figure 23:
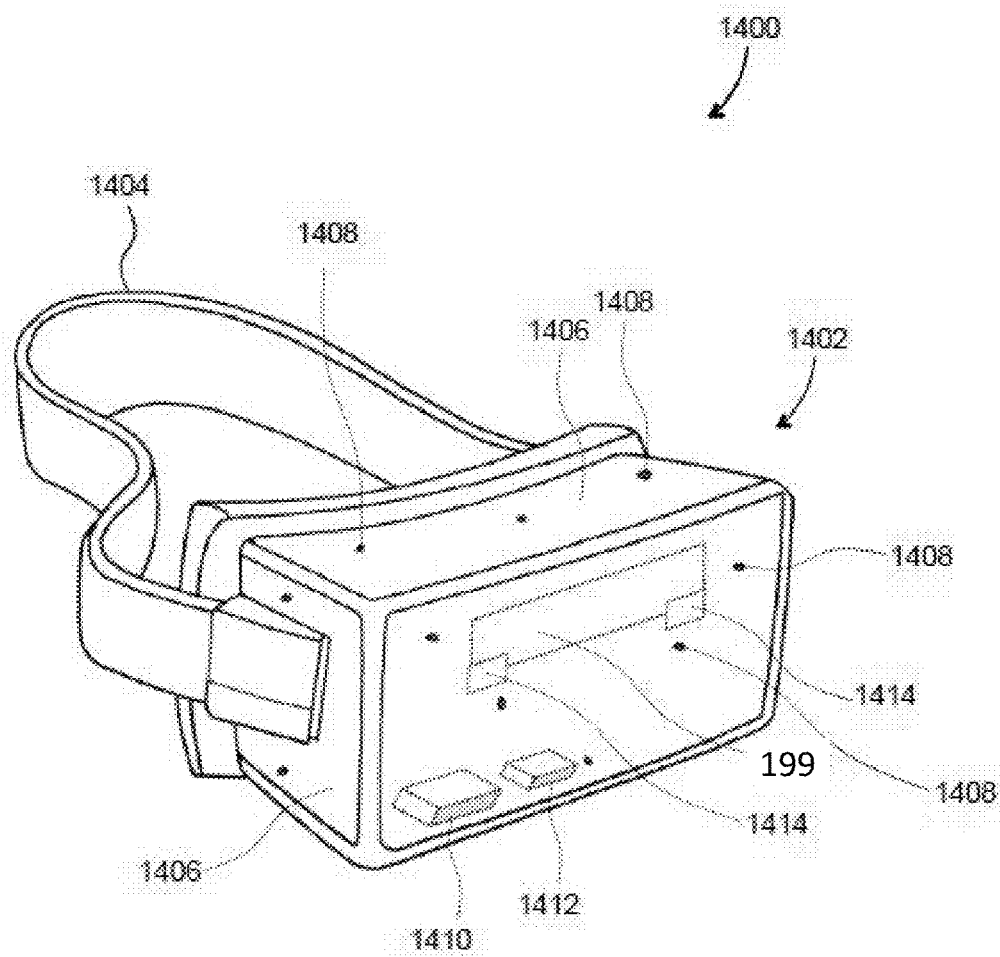
FIG. 23 is an isometric view of a head-mounted display (HMD).

Turning now to FIG. 23, there is illustrated an example head-mounted display (HMD) 1400 in which the dynamic image displacement for resolution enhancement and/or correction of defective pixels described above may be implemented. The HMD 1400 may provide content to a user as a part of an artificial reality system. The HMD 1400 may augment views of a physical, real-world environment with computer-generated imagery and/or to generate an entirely virtual 3D imagery. The HMD 1400 may include a front body 1402 and a head band 1404. The front body 1402 is configured for placement in front of eyes of a user, and the head band 1404 may be stretched to secure the front body 1402 on the user's head. A display module, such as the display module 199 with the dynamic image shifting described hereinabove, may be disposed in the front body 1402 for presenting imagery to the user with an enhanced resolution. Sides 1406 of the front body 1402 may be opaque or transparent. In some embodiments, the front body 1402 includes locators 1408, an inertial measurement unit (IMU) 1410 for tracking acceleration of the HMD 1400, and position sensors 1412 for tracking position of the HMD 1400. The locators 1408 are traced by an external imaging device of a virtual reality system, such that the virtual reality system can track the location and orientation of the entire HMD 1400. Information generated by the IMU and the position sensors 1412 may be compared with the position and orientation obtained by tracking the locators 1408, for improved tracking of position and orientation of the HMD. Accurate position and orientation is important for presenting appropriate virtual scenery to the user as the latter moves and turns in 3D space. The HMD 1400 may further include an eye tracking system 1414, which determines orientation and position of user's eyes in real time. The obtained position and orientation of the eyes allows the HMD 1400 to determine the gaze direction of the user and to adjust the image generated by the display module 199 accordingly.

Various structural features of a light steering device and principles of operation thereof for image enhancement by dynamic image displacement may also be used in various display systems other than an HMD. Example systems for which the image enhancing and/or correcting approach by dynamic image displacement as generally described hereinabove may be adopted include but not limited to various projection display systems wherein an image of an electronic display is projected on a surface, including projection systems for printing and lithography application that use pixelated displays to project patterns, heads-up displays (HUDs), and direct-view displays.

Furthermore, embodiments of a light steering device in which one or more polarization switches are disposed in sequence with one or more polarization gratings, such as those described hereinabove with reference to FIGS. 11, 13, 20 and 21, may be employed in other systems where light steering or switching may be useful. Their implementation using active LC waveplate and active or passive LC polarization gratings may enable very thin and lightweight devices that may be attractive in a variety of application. Embodiments of a light steering device using polarization gratings and/or polarization switches implemented in material systems other than liquid crystals are however also possible and are within the scope of the present disclosure.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. A display apparatus comprising:
    an electronic display comprising a pixel array configured to display a sequence of subframes;
    an optics block for forming an image of the pixel array, the image comprising an array of image pixels disposed at an image pixel pitch;
    wherein the optics block comprises an image shifting electro-optic device (ISOED) configured to have two or more discrete states, wherein switching between the two or more discrete states shifts at least a portion of the image by the image pixel pitch, or an integer multiple thereof, wherein the at least the portion of the image is comprised of image light from the electronic display; and
    a controller configured to switch the ISOED between the two or more discrete states in coordination with displaying the sequence of subframes, so as to form a sequence of offset subframe images at least partially correcting an image defect related to one or more defective display pixels in a compound image composed of the offset subframe images.

2. The display apparatus of claim 1 further comprising a display processor configured to obtain the sequence of subframes from an input image frame for correcting the image defect related to the one or more defective display pixels.

3. The display apparatus of claim 2 further comprising a memory coupled to at least one of the display processor or the controller, and configured for saving pixel information related to the one or more defective display pixels, and wherein the display processor is configured to generate the subframes based at least in part on the pixel information saved in the memory.

4. The display apparatus of claim 3 wherein the display processor is configured to generate at least one of a greyscale map or a subframe scaling map based at least in part on the pixel information saved in the memory, and to use the at least one of the greyscale map or the subframe scaling map to identify the one or more defective display pixels.

5. The display apparatus of claim 3 comprising a camera or detector system disposed to receive light emitted by the electronic display and configured to identify defective pixels in the pixel array of the electronic display.

6. The display apparatus of claim 1 wherein the controller is configured to cause the ISOED to shift the at least a portion of the image by the image pixel pitch, or the integer multiple thereof, between displaying consecutive subframes from the sequence of subframes.

7. The display apparatus of claim 1 wherein the ISOED is configured to shift the at least a portion of the image by the image pixel pitch, or the integer multiple thereof, in a first direction, and to shift the at least a portion of the image by a fraction of the image pixel pitch in a second direction.

8. The display apparatus of claim 1 wherein the pixel array of the electronic display is configured to emit the image light for displaying the subframes, and wherein the ISOED comprises
a first steering device configured to switchably impart a first angular shift in a first plane upon the image light so as to shift the at least a portion of the image by the image pixel pitch or the integer multiple thereof.

9. The display apparatus of claim 8 wherein the image light received by the first steering device is polarized, and wherein the first steering device comprises:
a first polarization switch configured to switch the image light between two orthogonal polarization states, and
a first polarization grating disposed in sequence with the first polarization switch and configured to diffract the image light of the two orthogonal polarization states at two polarization-dependent angles that differ by the first angular shift.

10. The display apparatus of claim 9 comprising a polarization conditioning device configured to transmit the image light towards the first polarization switch in a circular polarization state, and wherein:
the first polarization switch comprises a first switchable half-wave plate (HWP), and
the first polarization grating comprises at least one of a first Pancharatnam Berry Phase (PBP) grating or a first volume holographic grating.

11. The display apparatus of claim 9 further comprising a second steering device disposed in sequence with the first steering device, wherein the second steering device comprises:
a second polarization switch, and
a second polarization grating disposed in sequence with the second polarization switch and configured to diffract the image light incident thereon in dependence on a polarization state thereof for imparting a second angular shift upon the image light.

12. The display apparatus of claim 11 wherein the second polarization grating is configured to diffract the image light incident thereon in a different plane than the first polarization grating for imparting the second angular shift upon the image light.

13. The display apparatus of claim 11 comprising a polarization conditioning device disposed upstream of the first and second steering devices and configured to transmit the image light in a circular polarization state, and wherein:
at least one of the first polarization switch or the second polarization switch comprises a switchable half-wave plate (HWP), and
at least one of the first polarization grating and the second polarization grating comprises at least one of a Pancharatnam Berry Phase (PBP) grating or a holographic volume grating.

14. A method for operating an electronic display, the method comprising:
displaying, with a pixel array of the electronic display, a sequence of subframes;
forming an image of the pixel array while the sequence of subframes is being displayed, the image comprised of image light from the electronic display; and
shifting at least a portion of the image by an image pixel pitch or an integer multiple thereof using a light steering device having two or more discrete light steering states and in coordination with displaying the sequence of subframes so as to move an image pixel into a position of another image pixel prior to the shift to provide a compensation for defective pixels of the electronic display.

15. The method of claim 14 further comprising shifting the at least a portion of the image by a fraction of the image pixel pitch, and sub-sampling a higher-resolution input image frame with a matching sampling offset to obtain the sequence of subframes.

16. The method of claim 14 wherein the sequence of subframes comprises n consecutive subframes, wherein n is equal or greater than 2, the method further comprising sequentially shifting each image pixel of the at least a portion of the image to n different locations in an image plane over the sequence of n consecutive subframes, wherein at least one of the n different locations is shifted from at least another one of the n different locations by the image pixel pitch or the integer multiple thereof.

17. The method of claim 14 wherein the shifting comprises switching the image light between two orthogonal polarization states using one or more polarization switches, and steering the image light in dependence on a polarization state thereof using one or more polarization gratings.

* * * * *